United States Patent [19]
Okai et al.

[11] Patent Number: 5,687,045
[45] Date of Patent: Nov. 11, 1997

[54] THIN FILM MAGNETIC HEAD AND PRODUCTION METHOD THEREOF AND MAGNETIC DISK DRIVE EQUIPPED WITH THIS THIN FILM MAGNETIC HEAD

[75] Inventors: Tetsuya Okai; Moriaki Fuyama; Akira Onuma, all of Hitachi; Eiji Ashida, Hitachiohta; Hiroshi Ikeda, Tokyo; Saburo Suzuki, Minami-ashigara; Yasuo Wakaki, Hiratsuka; Yoshiki Hagiwara, Hadano; Eimi Ando, Hitachi, all of Japan

[73] Assignee: Hitachi, Ltd., Tokyo, Japan

[21] Appl. No.: 554,027

[22] Filed: Nov. 6, 1995

Related U.S. Application Data

[63] Continuation of Ser. No. 948,263, Sep. 21, 1992, abandoned.

[30] Foreign Application Priority Data

Sep. 20, 1991 [JP] Japan ................................ 3-242092
Jul. 21, 1992 [JP] Japan ................................ 4-193715

[51] Int. Cl.$^6$ ............................ G11B 5/31; G11B 5/235
[52] U.S. Cl. ................................ 360/126; 360/120; 360/122
[58] Field of Search ........................... 360/126, 120, 360/122, 125, 127, 119; 29/603, 603.01, 603.07, 603.11, 603.15, 603.18; 427/131, 132, 599; 428/900

[56] References Cited

U.S. PATENT DOCUMENTS

| | | | |
|---|---|---|---|
| 4,582,812 | 4/1986 | Furukawa et al. | 360/122 |
| 4,686,147 | 8/1987 | Matsuyama et al. | 360/119 |
| 4,803,338 | 2/1989 | Kumasaka et al. | 360/120 |
| 5,001,590 | 3/1991 | Saito et al. | 360/120 |
| 5,014,146 | 5/1991 | Takatsuka et al. | 360/106 |
| 5,079,662 | 1/1992 | Kawakami et al. | 360/126 |
| 5,083,365 | 1/1992 | Matsumoto | 29/603 |
| 5,109,312 | 4/1992 | Kato et al. | 360/126 |
| 5,126,907 | 6/1992 | Hamakawa et al. | 360/126 |
| 5,136,447 | 8/1992 | Makino et al. | 360/126 |
| 5,137,750 | 8/1992 | Amin et al. | 360/119 |
| 5,145,553 | 9/1992 | Albrechta et al. | 156/640 |
| 5,162,961 | 11/1992 | Takahashi et al. | 360/120 |
| 5,187,860 | 2/1993 | Horibata et al. | 29/603 |
| 5,255,142 | 10/1993 | Williams et al. | 360/125 |

FOREIGN PATENT DOCUMENTS 60-20306  2/1985  Japan.

OTHER PUBLICATIONS

IBM Technical Disclosure Bulletin, *Etching Ferrite Cores*, Collins and Youlton, vol. 25, No. 11B, Apr. 1983, p. 5902.

*Primary Examiner*—Stuart S. Levy
*Assistant Examiner*—David L. Ometz
*Attorney, Agent, or Firm*—Antonelli, Terry, Stout & Kraus, LLP.

[57] ABSTRACT

A thin film magnetic head comprising a sintered ceramic substrate, an underlayer, a bottom magnetic core film, a magnetic gap film, an insulating film containing coil windings, a top magnetic core film, and a protective layer. The substrate and other films and layers form an air bearing surface. The under layer, the magnetic gap film and the protective layer comprise $Al_2O_3$, and the bottom and the top magnetic core films comprise Ni—Fe alloy. This structure gives substantially the same etching rate, when the air bearing surface is polished using a working fluid of pH 6–8, for any of the substrate, the films comprising $Al_2O_3$ and metal oxide described above, and the films of Ni—Fe alloy. Thus, steps (pole top recessions) on the air bearing surface can be made as small as 0.015 μm or less. Accordingly, the magnetic head can be held in a stable attitude, thus obtaining good recording characteristics.

35 Claims, 16 Drawing Sheets

THIN FILM MAGNETIC HEAD AND PRODUCTION METHOD THEREOF AND MAGNETIC DISK DRIVE EQUIPPED WITH THIS THIN FILM MAGNETIC HEAD

This application is a Continuation of application Ser. No. 07/948,263, filed Sep. 21, 1992, now abandoned.

BACKGROUND OF THE INVENTION

1. Field of the Invention

The present invention relates to a thin film magnetic head for writing and reading information on a magnetic recording medium and relates to a magnetic disk drive containing a thin film magnetic head, and also relates to a production method of a thin film magnetic head. More specifically, the present invention relates to a thin film magnetic head which exhibits high performance in recording and reproducing information on a magnetic recording medium.

2. Description of the Related Art

A conventional thin film magnetic head having a $Al_2O_3$ layer as one of component elements is discussed in Japanese Patent Application Laid-Open No.62-214507(1987) and Japanese Patent Application Laid-Open No.63-16408 (1988). However, neither of both Japanese Patent Application Laid-Open No.62-214507(1987) and Japanese Patent Application Laid-Open No.63-16408(1988) discusses the problem that component elements, such as an under layer, magnetic gap film, and a protective layer, are etched by a cleaning liquid which is used during production processes.

SUMMARY OF THE INVENTION

In view of the above, it is an object of the present invention to provide a thin film magnetic head which has a small recession on an air bearing surface and which exhibits good recording characteristics, and to provide a production method thereof.

In a preferred embodiment of the present invention, a thin film magnetic head comprises an under layer formed on a substrate; a bottom magnetic core film formed on the under layer; a top magnetic core film which contacts the bottom magnetic core film on one side and which is opposed to the bottom magnetic core film via a magnetic gap film on the other side; and a protective layer formed on the top magnetic core film; wherein the under layer, the magnetic gap film, and the protective layer are composed of $Al_2O_3$ and metal oxide having an oxidation number larger than that of $Al_2O_3$.

In another preferred embodiment, a thin film magnetic head comprises an under layer formed on a substrate; a bottom magnetic core film formed on this under layer; a magnetic gap film formed on the bottom magnetic core film; an insulating film which is formed on the magnetic gap film so that the insulating film surrounds coil windings; a top magnetic core film which covers the insulating film and which extends onto the surface of the magnetic gap film on one side and which extends onto the surface of the bottom magnetic core film on the other side; a protective layer formed on the top magnetic core film.

Further, in another preferred embodiment of the present invention, a thin film magnetic head comprises an under layer formed on a substrate; a bottom magnetic core film formed on the under layer; a top magnetic core film which contacts the bottom magnetic core film on one side and which is opposed to the bottom magnetic core film via a magnetic gap film on the other side; and a protective layer formed on the top magnetic core film; wherein the under layer, the magnetic gap film, and the protective layer are composed of $Al_2O_3$ and at least one of $ZrO_2$, $TiO_2$, $HfO_2$, $Y_2O_3$, $Ta_2O_5$, $Nb_2O_5$, $Ceo_2$, and $SiO_2$.

In another preferred embodiment, a magnetic gap film, and a protective layer of the thin film magnetic head have etching rate of 0.1–15 A/min for water of pH of 6–8 at 40°–60° C.

Further, in another preferred embodiment, the maximum pole tip recession on one end face consisting of each one end face of the substrate, the under layer, the bottom magnetic core film, the magnetic gap film, the top magnetic core film, and the protective layer, which are opposed to said magnetic disk, is 0.001–0.015 μm after the cleaning process using deionized water.

Still further, in another preferred embodiment, the under layer, the magnetic gap film, and the protective layer of a thin film magnetic head exhibit etching rate of 1–100 nm/hr for deionized water of resistivity larger than 10 MΩcm.

Moreover, in another preferred embodiment, the under layer, the magnetic gap film, and the protective layer exhibit etching rate of 1–100 nm/hr for lapping fluid of pH 6–8 and for removing liquid of pH 9–11.

In another preferred embodiment, the under layer, the magnetic gap film, and the protective layer are made up of materials different from the material of the substrate, and all of these material have substantially the same etching rate.

Furthermore, in another preferred embodiment, a thin film magnetic head comprises an under layer formed on a ceramic substrate, a bottom magnetic core film formed on this under layer, a top magnetic core film which contacts the bottom magnetic core film on one side and which is opposed to the bottom magnetic core film via a magnetic gap film on the other side, a protective layer formed on the top magnetic core film, wherein the under layer, the magnetic gap film, and the protective layer are made up of inorganic materials by means of sputtering which exhibit essentially the same etching rate for deionized water as that of the substrate.

Furthermore, in another preferred embodiment, a thin film magnetic head of another embodiment of the present invention comprises an under layer formed on a ceramic substrate, a bottom magnetic core film formed on this under layer, a top magnetic core film which contacts the bottom magnetic core film on one side and which is opposed to the bottom magnetic core film via a magnetic gap film on the other side, a protective layer formed on the top magnetic core film, wherein the under layer, the magnetic gap film, and the protective layer are made up of inorganic materials by means of sputtering which exhibit the etching rate different from that of the substrate by 0.1–15 Å/min.

As an another preferred embodiment, the present invention provide a magnetic disk drive equipped with such a thin film magnetic head described above.

Moreover, in another preferred embodiment, a magnetic disk drive comprises a magnetic disk on which information is recorded and a thin film magnetic head for recording information on the magnetic disk, wherein the thin film magnetic head comprises an under layer formed on a substrate; a bottom magnetic core film formed on this under layer; a top magnetic core film which contacts the bottom magnetic core film on one side and which is opposed to the bottom magnetic core film via a magnetic gap film on the other side; a protective layer formed on the top magnetic core film; and wherein the maximum pole tip recession on one end face consisting of each one end face of the substrate, the under layer, the bottom magnetic core film, the magnetic gap film, the top magnetic core film, and the protective layer, which are opposed to said magnetic disk, is 0.001–0.015 μm, and further wherein the thin film magnetic head has the flying height of 0.01–0.1 μm with respect to the magnetic disk. Here, "one end face" means the surface of a magnetic head which is opposed to a magnetic disk to write and read information on it.

In another preferred embodiment, a magnetic disk drive further includes a magnetoresistance head for reading the information recorded on the magnetic disk in addition to a thin film magnetic head described above.

A production method for producing a thin film magnetic head comprising an under layer formed on a substrate; a bottom magnetic core film formed on the under layer; a top magnetic core film which contacts the bottom magnetic core film on one side and which is opposed to the bottom magnetic core film via a magnetic gap film on the other side; and a protective layer formed on the top magnetic core film; has steps for processing one end face consisting of each one end face of the substrate, the under layer, the bottom magnetic core film, the magnetic gap film, the top magnetic core film, and the protective layer; wherein one of the steps described above is carried out using warm water of pH 6–8 at temperatures of 40°–60° C.

Furthermore, in another preferred embodiment, a production method for producing a thin film magnetic head comprising an under layer formed on a substrate; a bottom magnetic core film formed on the under layer; a top magnetic core film which contacts the bottom magnetic core film on one side and which is opposed to the bottom magnetic core film via a magnetic gap film on the other side; and a protective layer formed on the top magnetic core films; having steps for processing one end face consisting of each one end face of the substrate, the under layer, the bottom magnetic core film, the magnetic gap film, the top magnetic core film, and the protective layer; wherein the steps described above have steps for cleaning using deionized water.

Here, it is one of characteristic aspects of the present invention that in processing steps described above, Freon is not used for cleaning.

In another preferred embodiment, a production method for producing a thin film magnetic head comprising an under layer formed on a substrate; a bottom magnetic core film formed on the under layer; a top magnetic core film which contacts the bottom magnetic core film on one side and which is opposed to the bottom magnetic core film via a magnetic gap film on the other side; and a protective layer formed on the top magnetic core films; has steps for processing one end face consisting of each one end face of the substrate, the under layer, the bottom magnetic core film, the magnetic gap film, the top magnetic core film, and the protective layer; wherein the steps described above have steps of: lapping process using lapping liquid of pH 6–8; removing process using removing liquid of pH 9–11; and cleaning process using deionized water of pH 6–8.

In another preferred embodiment of a production method for producing a thin film magnetic head described above, ultrasonic power is applied during the cleaning process using deionized water.

In another preferred embodiment, a production method for producing a thin film magnetic head comprises an under layer formed on a substrate; a bottom magnetic core film formed on this under layer; a magnetic gap film formed on the bottom magnetic core film; an insulating film which is formed on the magnetic gap film so that the insulating film surrounds coil windings; a top magnetic core film which covers the insulating film and which extends onto the surface of the magnetic gap film on one side and which extends onto the surface of the bottom magnetic core film on the other side; a protective layer formed on the top magnetic core film; has steps for processing one end face, via which information is written and read, and which consists of each one end face of the substrate, the under layer, the bottom magnetic core film, the magnetic gap film, the top magnetic core film, and the protective layer; wherein the steps described above have steps of cleaning process using deionized water of resistivity larger than 10 MΩcm.

Thin film magnetic heads are used in such a way that a thin film magnetic head floats at a certain appropriate height (flying height) above a recording medium rotating at a constant rate. In order to obtain good recording characteristics, the flying height should be maintained constant. And smaller flying heights are more desirable as long as the magnetic head does not contact a recording medium.

The flying height is determined by three factors: a weight of a slider which holds a thin film magnetic head floating over a recording medium, a load applied to the slider, and a flow of air between a recording medium and a slider. The weight of a slider and the load applied to a slider are always constant. Therefore, the flow of air between a recording medium and a slider should be controlled to be constant in order to maintain a constant flying height.

If there is a pole tip recession on an air bearing surface of a thin film magnetic head, the flow of air is fluctuated at the recession, thus the flying height is also fluctuated. Furthermore, some dust might be stuck to the recession and a head crash might occur. Hence, it is impossible to obtain a good recording characteristics.

As shown in FIG. 17, the effective flying height He associated with recording characteristics can be defined by a distance between the surface of magnetic layer 104b of a magnetic disk 104—a magnetic medium—and an end of a magnetic layer 13 (13') or a magnetic core on an air bearing surface 105a of a magnetic head 105. On the other hand, when there is a recession on an air bearing surface 105a that the end of a magnetic layer is recessed from other portions as shown in FIG. 2, the apparent flying height Hm can be defined by the minimum distance between the highest surface of a magnetic disk 104 and an air bearing surface 105a of magnetic head 105, and this apparent flying height differs from the effective flying height He. To reduce the effective flying height He, it is required to make the difference as small as possible between the apparent flying height Hm and the effective flying height He. As a conclusion, in order to obtain good recording characteristics, it is needed to make the pole tip recession R as small as possible.

We made an experimental consideration to know the relationship between the pole tip recession on an air bearing surface of a magnetic head and the head crash. The flying height of a thin film magnetic head was maintained constant at a certain value, and a magnetic disk was forced to rotate at a certain constant rotation rate until a crash occurred finally. The life time measured by such a way is shown in FIG. 3. As can be seen from this figure, pole tip recessions less than 0.015 μm give a long enough life. As for the relationship between the flying height and the pole tip recession, it is desirable, ideally, that there is no pole recession. However, in practice, it is impossible to make a pole tip recession zero. From a practical point of view, it is desirable to make a pole tip recession less than a tenth of a flying height. One reason for that is a limitation given by production processes, and the other reason is that a slider has a certain tilt with respect to a magnetic disk in its sliding motion. Therefore, a practical pole tip recession is from 0.001 to 0.015 µm.

The dominant factor which brings about a pole tip recession is the difference in etching rate between various layers such as a substrate, an under layer, a magnetic gap film, a protective layer, a top magnetic core film, and a bottom magnetic core film, which are exposed to the air bearing surface. That is, each of end faces of these films exposed at the air bearing surface is etched at different rates respectively by working fluid for lapping or rinse when an air bearing surface is processed.

To reduce the pole tip recession, each of layers, a substrate, an under layer, a magnetic gap film, a protective layer, a top magnetic core film, and a bottom magnetic core film, should have nearly the same etching rate for working fluid used in the process of lapping and cleaning. Magnetic films of Ni—Fe alloys are easily etched by strong acids as shown in FIG. 13, however they are almost never etched in a solution having pH larger than 6. A substrate made up of ceramics of $Al_2O_3$ and TiC exhibits high corrosion resistance and it is almost never etched in any working fluid. Therefore, one option might be to use the same material as the substrate material also for other layers such as an under layer, a magnetic gap film, and a protective layer. But, because the substrate is used as a slider, it should have high resistance to sliding. On the other hand, because a protective layer and other layers are formed by sputtering, it is important for these layers to have a high deposition rate, a small residual stress, and high transparency. Furthermore, there is difference in production method between these layers, that is, while a substrate is made by sintering, a protective layer and other layers are formed by sputtering. This difference in production method results in difference in characteristics such as hardness and corrosion resistance between these layers even in the case that the layers have the same composition. In view of the above, in the present invention, inorganic insulating films having high corrosion resistance against working fluid for lapping or cleaning are used for an under layer, a magnetic gap film, a protective layer to reduce the pole tip recession.

From the above point of view, we made experimental consideration on the relationship between the maximum etching rate and the pole tip recession when these inorganic insulating films used for an under layer, a magnetic gap film, and a protective layer are immersed in solutions of pH 2 to pH 12. As a result of these experiments, we found out that it is possible to make the pole tip recession less than 0.015 µm if we use inorganic insulating films which show the maximum etching rate less than 100 nm/hr in solutions of pH 2 to pH 12.

$Al_2O_3$, which is used conventionally for an under layer, a magnetic gap film, and a protective layer and other layers, has a characteristic aspect that while crystalline $Al_2O_3$ exhibits high resistance to chemicals, $Al_2O_3$ formed by sputtering shows an amorphous structure of $\gamma$-$Al_2O_3$ and does not have good resistance performance to chemicals. Therefore, the sputtered $Al_2O_3$ is etched by solutions used for lapping or rinse when thin film magnetic heads are processed, thus resulting in a pole tip recession. Especially, the $Al_2O_3$ film shows inferior corrosion resistance in a cleaning process using deionized water. This is due to the fact that in the amorphous structure of sputtered $\gamma$-$Al_2O_3$, Al atoms have dangling bonds which are unstable and ready to produce aluminum hydrate which can easily leave from a surface of the layer. To delete the dangling bonds and to avoid the generation of aluminum hydrate, it is effective to add metal oxides having oxidation number which equals or is larger than that of $Al_2O_3$ to the sputtered $Al_2O_3$ thin film. Thus, the film including such a metal oxides exhibits low etching rate and it is possible to avoid the generation of large pole tip recessions. Such a thin film can be formed by sputtering a sintered target composed of a mixture of $Al_2O_3$ and at least one of metal oxides: $ZrO_2$, $HfO_2$, $TiO_2$, $Y_2O_3$, $Ta_2O_5$, $Nb_2O_5$, $CeO_2$, $SiO_2$.

Most of thin films of $Al_2O_3$ and metal oxides which are formed by sputtering produce hydrates at their surface when they are immersed in working fluid for lapping or cleaning during a lapping process. These hydrates swell and deposit. Furthermore, the solution removes these hydrate from the surface of the thin film. In this way, etching of the thin film occurs. In general, the generation rate of these hydrates shows the minimum values when the solution has pH 6 to pH 8. That is, it is found out that the thin films show the minimum etching rate for the solution of pH 6–pH 8.

As described above, in the present invention, an under layer, a magnetic gap film, and a protective layer of thin film magnetic head are formed by sputtering a sintered target composed of a mixture of $Al_2O_3$ and at least one of metal oxides: $ZrO_2$ $HfO_2$, $TiO_2$, $Y_2O_3$, $Ta_2O_5$, $Nb_2O_5$, $CeO_2$, $SiO_2$, then an air bearing surface of a thin film magnetic head is processed by using solutions for lapping and cleaning having pH 6 go pH 8. Thus, it is possible to manufacture thin film magnetic heads having a small pole tip recession such as less than 0.015 µm on an air bearing surface. Moreover, thin film magnetic heads of the present invention can have small flying height and shows small fluctuations in flow of air between an air bearing surface and a recording medium. And it is possible to keep the flying height to a stable constant value. As a result of this, good recording characteristics can be achieved. Furthermore, the small recession leads to the advantage that foreign particles do not stick between a recording medium and an air bearing surface. High reliability can be also achieved because there is no chance for foreign particles to destroy thin film magnetic head.

Solutions for lapping or cleaning which are based on deionized water can take place of Freon which has been used as wording fluid for such purposes. This is important if it is considered a fact that usage of Freon is going to be prohibited for the protection of the global environment.

Conventionally, Freon has been also used for processing the air bearing surface of thin film magnetic heads and for cleaning after that, because of its strong detergency and good cleanness. However, warm deionized water is going to be used instead of Freon for the reason described above. Water is heated to 40°–60° C. to obtain good detergency and quick drying. The present invention can avoid the undesirable etching during the cleaning process in water.

DESCRIPTION OF THE PREFERRED EMBODIMENTS

Referring to figures, preferred embodiments of the present invention are described below.

EMBODIMENT 1

Figure 1:
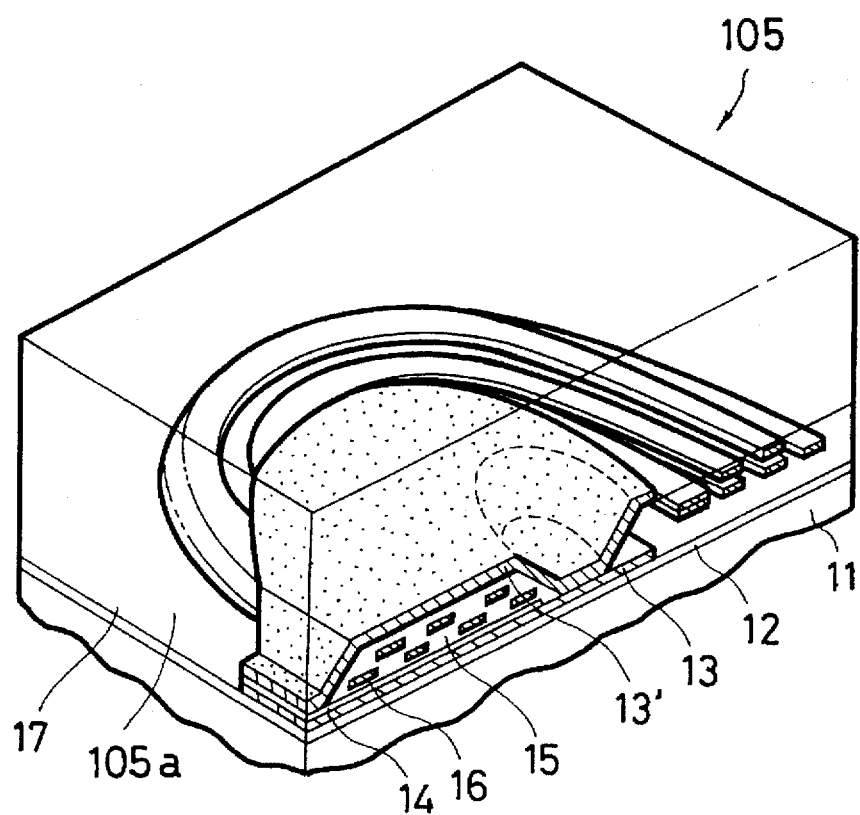
FIG. 1 is a perspective view, partially cross sectioned, of a thin film magnetic head embodying the present invention, showing the structure of its central portion on the cross section taken from the end face of an air bearing surface to the other end face.

As recording densities of magnetic disk drives for storing data become higher, smaller flying heights (distance between the surface of a thin film magnetic head and the surface of a recording medium) are required for thin film magnetic head. FIG. 1 is a perspective view, partially cross sectioned, of a thin film magnetic head, showing the structure of its central portion on the cross section taken from the end face of an air bearing surface to the other end.

As shown in FIG. 1, a thin film magnetic head of a first embodiment of the present invention comprises a nonmagnetic ceramic substrate 11, an under layer 12 on the substrate, a bottom magnetic core film 13 on the under layer 12, a magnetic gap film 14 on the bottom magnetic core film 13, an insulating layer 15 containing coil windings 16 on the bottom magnetic core film, a top magnetic core film 13' covering the insulating layer 15, and a protective layer on the top. An air bearing surface 105a (the surface on the left portion of the FIG. 1), which is opposed to a surface of a recording medium, consists of each exposed end of the substrate 11, the under layer 12, the magnetic gap film 14, bottom and top magnetic core films 13, 13' containing the magnetic gap film 14 between them, and the protective layer 17.

In this first embodiment of a thin film magnetic head, $Al_2O_3$—$ZrO_2$ films or $ZrO_2$ films are used for insulating component elements such as an under layer 12, a magnetic gap film 14, and a protective layer 17. Permalloy, a Ni—Fe alloy, is used for top and bottom magnetic core films 13 and 13'.

During the operation, the end face of a thin film magnetic head flies above the surface of a recording medium opposing it. Therefore, this end face will be called air bearing surface hereafter.

The ceramic substrate 11 is made by sintering and it has large hardness and also exhibits high corrosion resistance. On the other hand, the under layer 12, the magnetic gap film 14, bottom and top magnetic core films 13, 13', and the protective layer 17 are formed by sputtering and their hardness is lower than that of the substrate 11. Corrosion resistance of such films according to the conventional technology has been poor compared to that of ceramic substrate 11. Such a problem can be effectively solved by the present invention.

Thin film magnetic heads are manufactured by the following process steps. First, plural thin film magnetic heads are formed with thin films on a large size of substrate. Then each head is cut away from each other. The end face of each divided thin film magnetic head is lapped using lapping slurry containing abrasive grains, a dispersant, and a surface active agent. After that, each head is cleaned using cleaning liquid. Prior to these process steps, thin film magnetic heads are attached to a jig such that the surface opposite to the air bearing surface is adhered to the jig with adhesive, then air bearing surfaces are lapped on a press platen via lapping slurry. After the lapping process is completed, the adhesive is removed with removing liquid to separate the thin film magnetic head from the jig.

Figure 2:
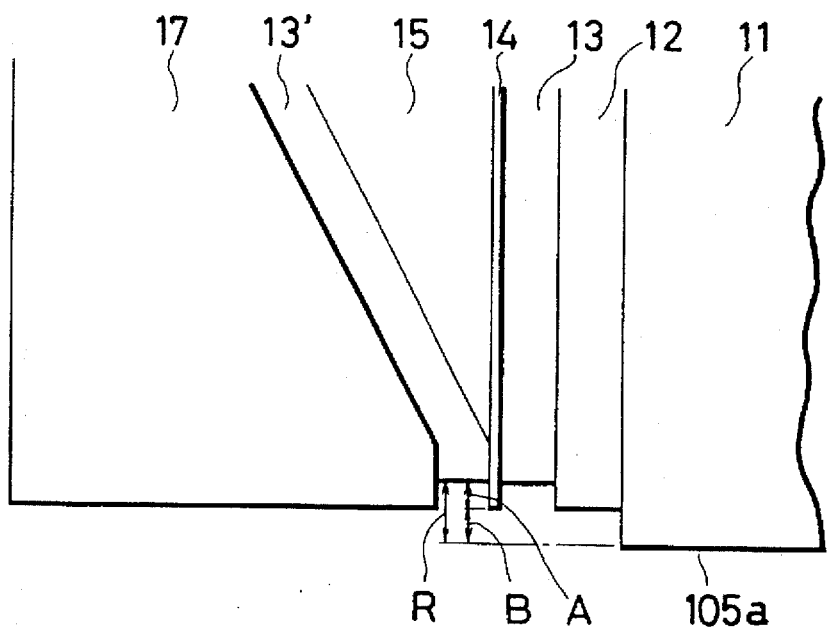
FIG. 2 is a schematic diagram for explanation of a pole tip recession which is generated during a process of an air bearing surface of a thin film magnetic head.
Figure 3:
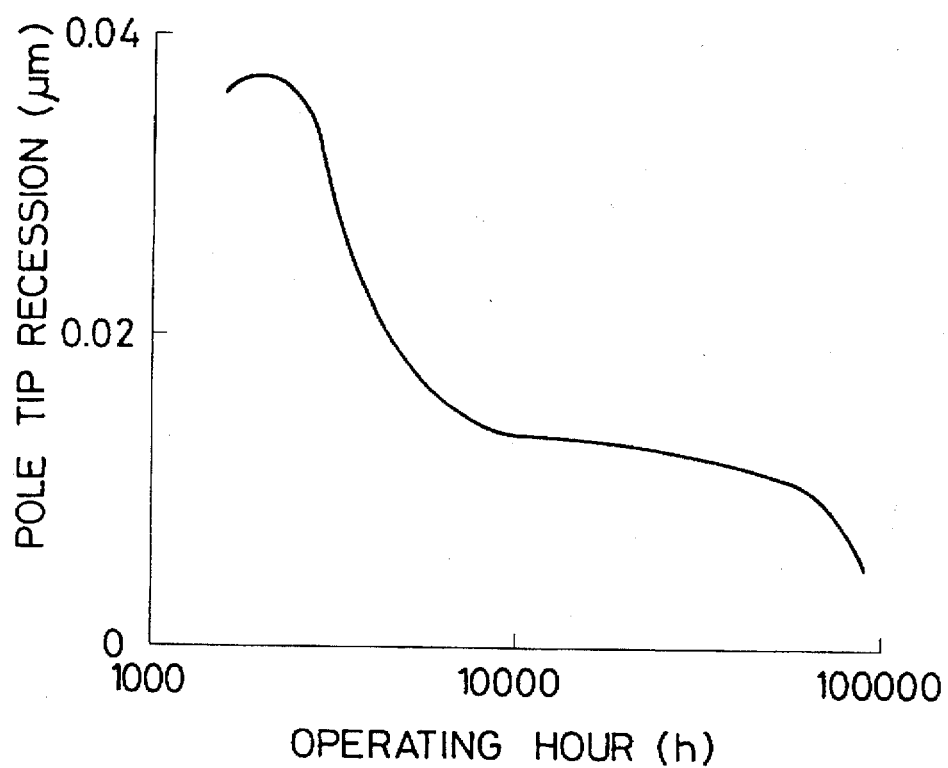
FIG. 3 is a graph showing relationship between a head crash and a pole tip recession of a thin film magnetic head in an accelerated life test.
Figure 4:
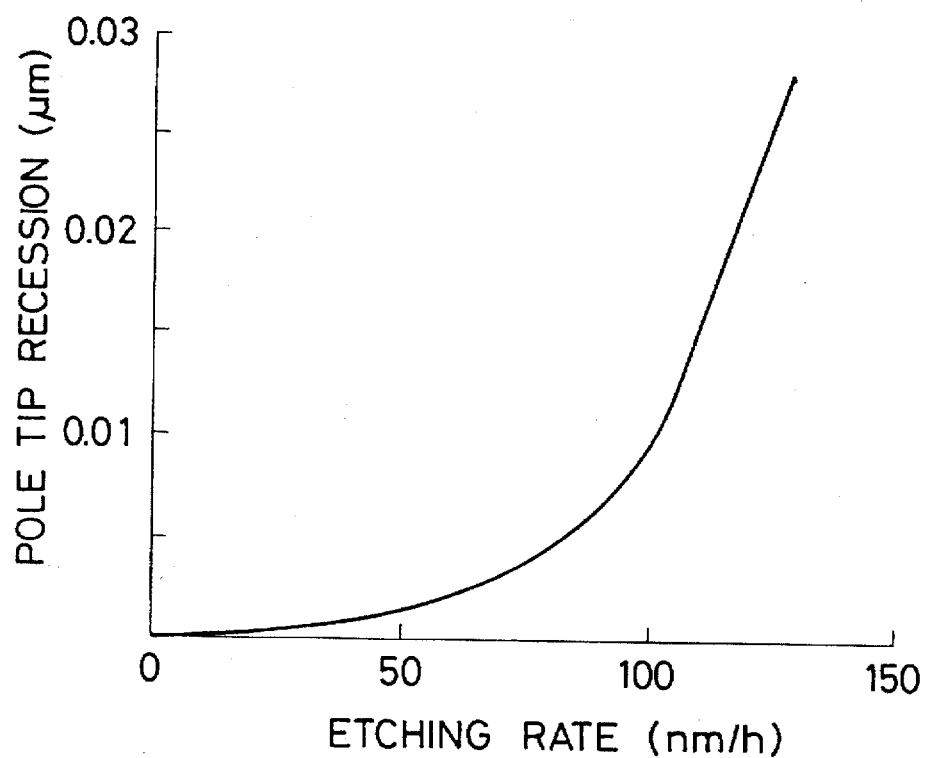
FIG. 4 is a graph showing relationship between etching rates and pole tip recessions on an air bearing surface of a thin film magnetic head.

During the lapping process, pole tip recession is generated on the air bearing surface, as shown in FIG. 2. The pole tip recession is defined as a maximum distance R between the air bearing surface and the deepest recession of ends of magnetic core films 13, 13', the substrate 11, the under layer 12, the protective layer 17, and the magnetic gap film 14.

The main reason for generation of pole tip recessions in conventional technology is that there exists the difference in etching characteristics for working fluid such as lapping slurry or cleaning liquid between film materials: $Al_2O_3$ thin films used for an under layer 12, a magnetic gap film 14, and a protective layer 17; Ni—Fe alloy films used for magnetic core films 13 and 13'; and $Al_2O_3$—TiC, or $Al_2O_3$—$ZrO_2$ used for a substrate. That is, lapping slurry or cleaning liquid etches larger amount of $Al_2O_3$ films or Ni—Fe alloy films than that of sintered $Al_2O_3$—TiC. Especially, $Al_2O_3$ films are etched quickest. The present invention is carried out based on the above knowledge.

Too large pole tip recessions formed during the process result in too large fluctuation of the flow of air during the operation, and bring about too large variation in flying height. Consequently, there exists large scattering in recording characteristics of thin film magnetic heads. Furthermore, foreign particles might stick to the pole tip recession. These particles, furthermore, might contact the surface of a recording medium to destroy the head. Moreover, because a pole tip recession acts as a part of total flying height, the effective flying height would become large, thus resulting in poor recording characteristics. The present invention deletes effectively the pole tip recessions and the above problems have been solved.

Figure 16:
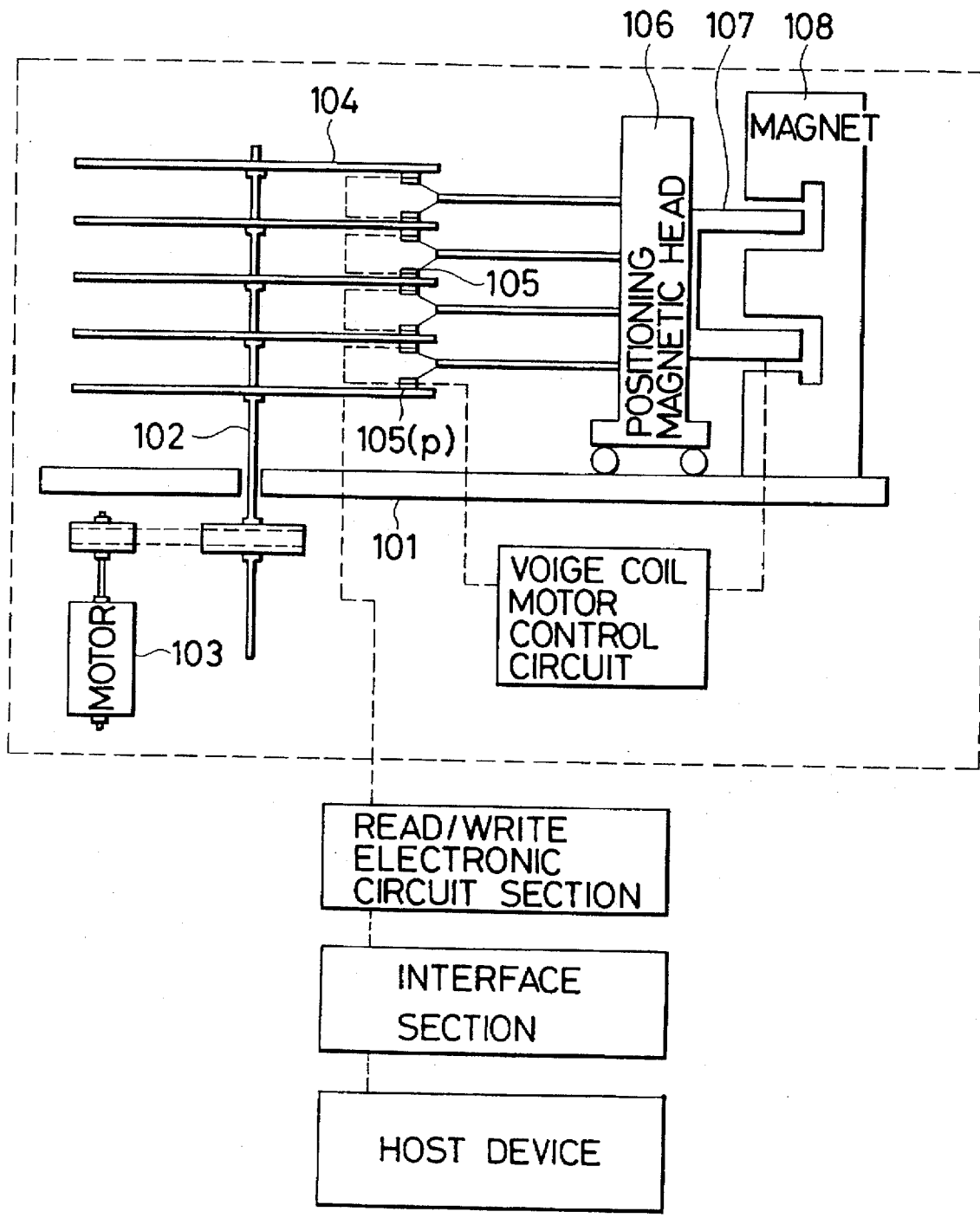
FIG. 16 is a schematic diagram showing an example of a configuration of a magnetic disk drive.

FIG. 16 is a schematic diagram showing an example of a configuration of a magnetic disk drive of the present invention. This magnetic disk drive has plural disks 104 acting as magnetic recording medium which are fixed to a spindle 102, an electric motor 103 for driving the spindle 102, a set of magnetic heads held by a mobile carriage 106, a voice coil motor (composed of a voice coil 107 and a magnet 108) for driving the carriage 106, and a base 101 for supporting these members. It also has a voice-coil-motor control circuit for controlling the voice coil motors 107 and 108 according to the signals received from a host system such as a disk control unit. The magnetic disk drive also has a read/write circuit for writing the data received from a host system on the magnetic disks 104 and for reading the data stored on the magnetic disks 104. This read/write circuit is connected to a host system via an interface. The magnetic disks 104 are composed of nonmagnetic disk material such as aluminum having a magnetic thin film formed on one of its surfaces or having magnetic thin films formed on both surfaces.

The writing operation of this magnetic disk drive will be described next. When a host system gives a writing position data to a voice-coil-motor control circuit via an interface, the voice-coil-motor control circuit controls voice coil motors 107 and 108 to move quickly the carriage 106 so that the set of magnetic heads 105 move to the position corresponding to the position data. Here, a positioning magnetic head 105(p) connected to the voice-coil-motor control circuit detects the head position on the magnetic disks 104. On the other hand, the electric motor 103 supported on the base 101 rotates the plural magnetic disks 104 fixed to the spindle 102. Then, one of the magnetic heads 105 is selected depending on the signal from the read/write circuit, and the selected magnetic head 105 detects the writing position on the magnetic disk 104, and then writes the data received from the host system on the disk 104. Here, the host system is, for example, a computer system.

Figure 17:
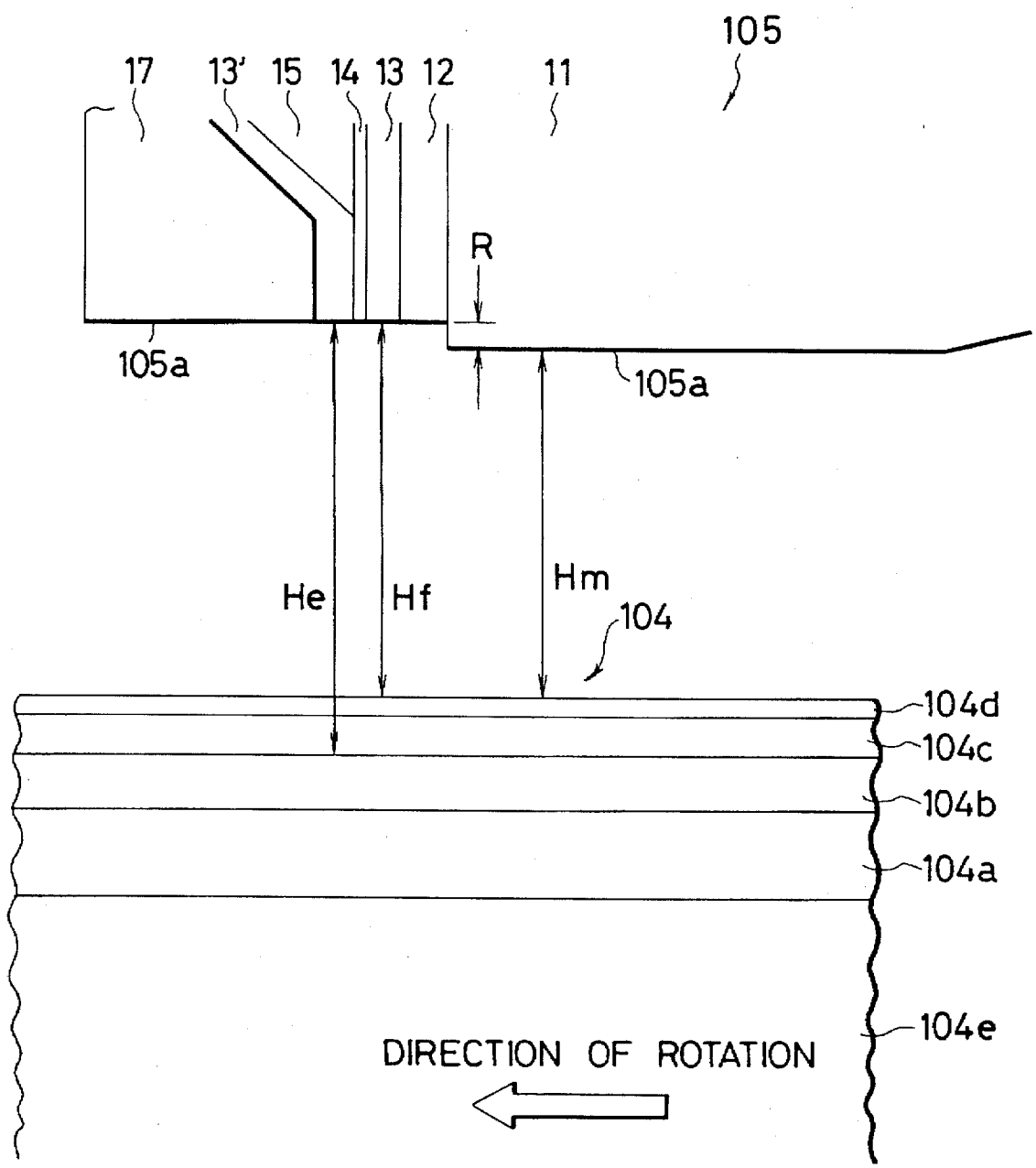
FIG. 17 is a schematic diagram for explanation of a thin film magnetic head in a state that it floats over a magnetic disk.

FIG. 17 shows a magnetic head 105 in a state of flying above a rotating magnetic disk 104. The magnetic head 105 has a substrate 11, one of component elements, acting as a slider for making the magnetic head fly. The slider contacts a magnetic disk 104 and slides on it when the magnetic disk 104 starts rotating and also when it stops rotating. Therefore, the material of the slider should exhibit high resistance to sliding. From this point of view, sintered materials having large hardness are used for a substrate 11.

A magnetic disk 104 as a recording medium comprises, from the bottom to the top, a disk substrate 104e, an under layer 104a, a magnetic film 104b, a protective layer 104c, a lubricant layer 104d. The total thickness of the protective layer 104c and the lubricant layer 104d is about 20–40 nm. The effective flying height associated with recording characteristics is defined by He which is a distance between the surface of a magnetic film 104b of a magnetic disk 104 and ends of magnetic film 13 and 13' of magnetic core of a magnetic head which are opposed to the surface of the recording medium.

On the other hand, an apparent flying height can be defined as a minimum distance Hm between the surface of a magnetic disk 104 and an air bearing surface. Hereafter, just expression of "flying height" denotes an apparent flying height which is a distance Hf between the surface of a magnetic disk 104 and the surface of magnetic films of magnetic cores on an air bearing surface of a magnetic head.

Figure 18:
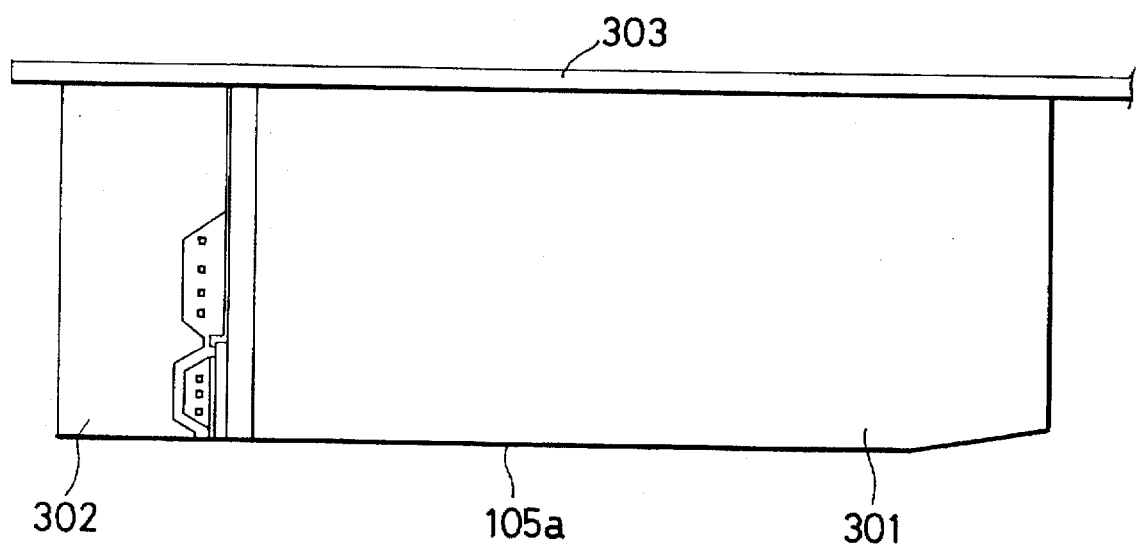
FIG. 18 is a schematic diagram showing a slider composed of a substrate and showing portions of thin film layers.

FIG. 18 is a schematic diagram showing a slider. A slider 301 is installed to a carriage 106 via Gimbal spring 303 and loading arm (not shown in the figure).

Figure 5:
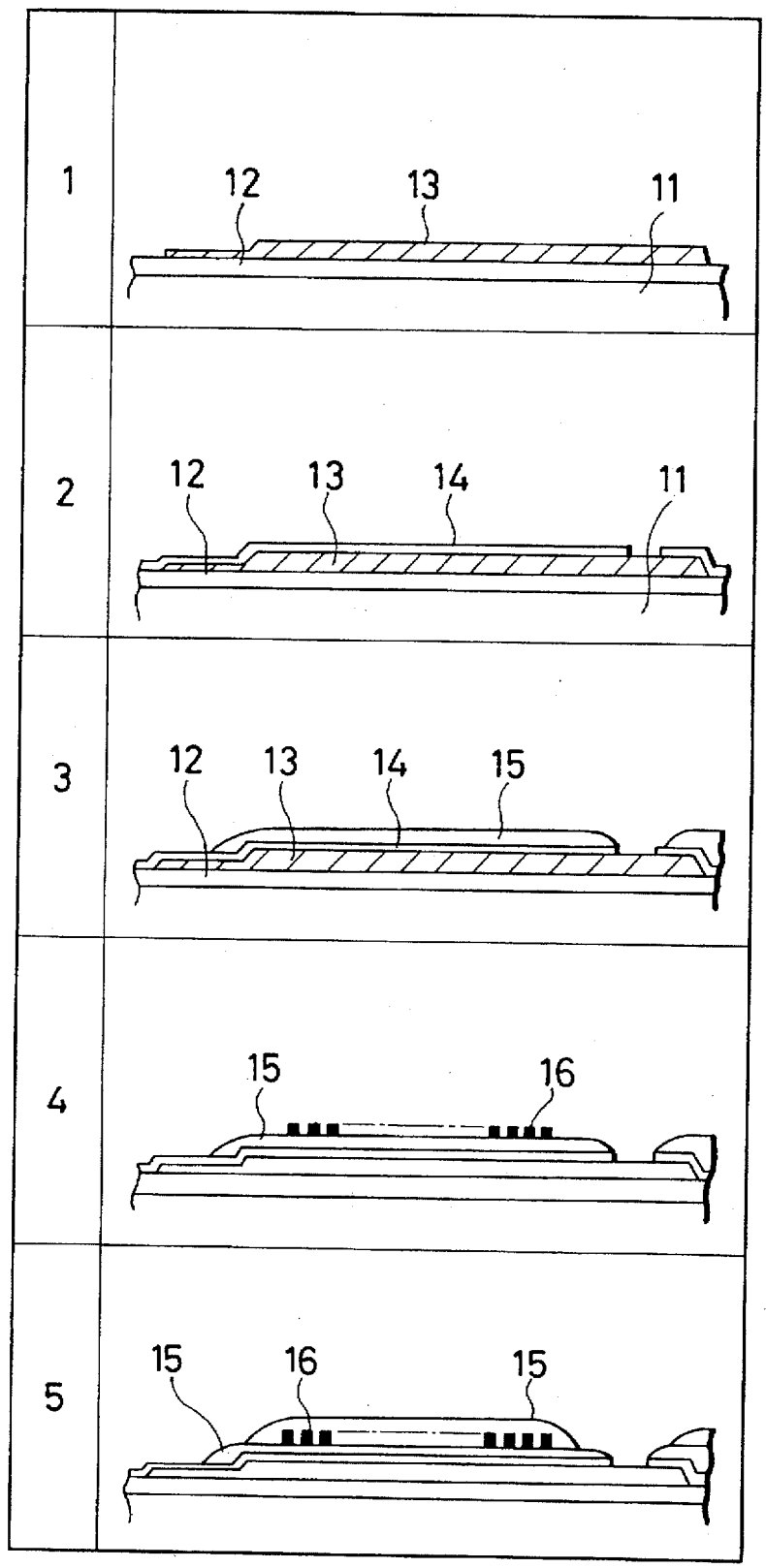
FIG. 5 is a schematic diagram showing the process (steps 1–5) for forming thin films of a thin film magnetic head.
Figure 6:
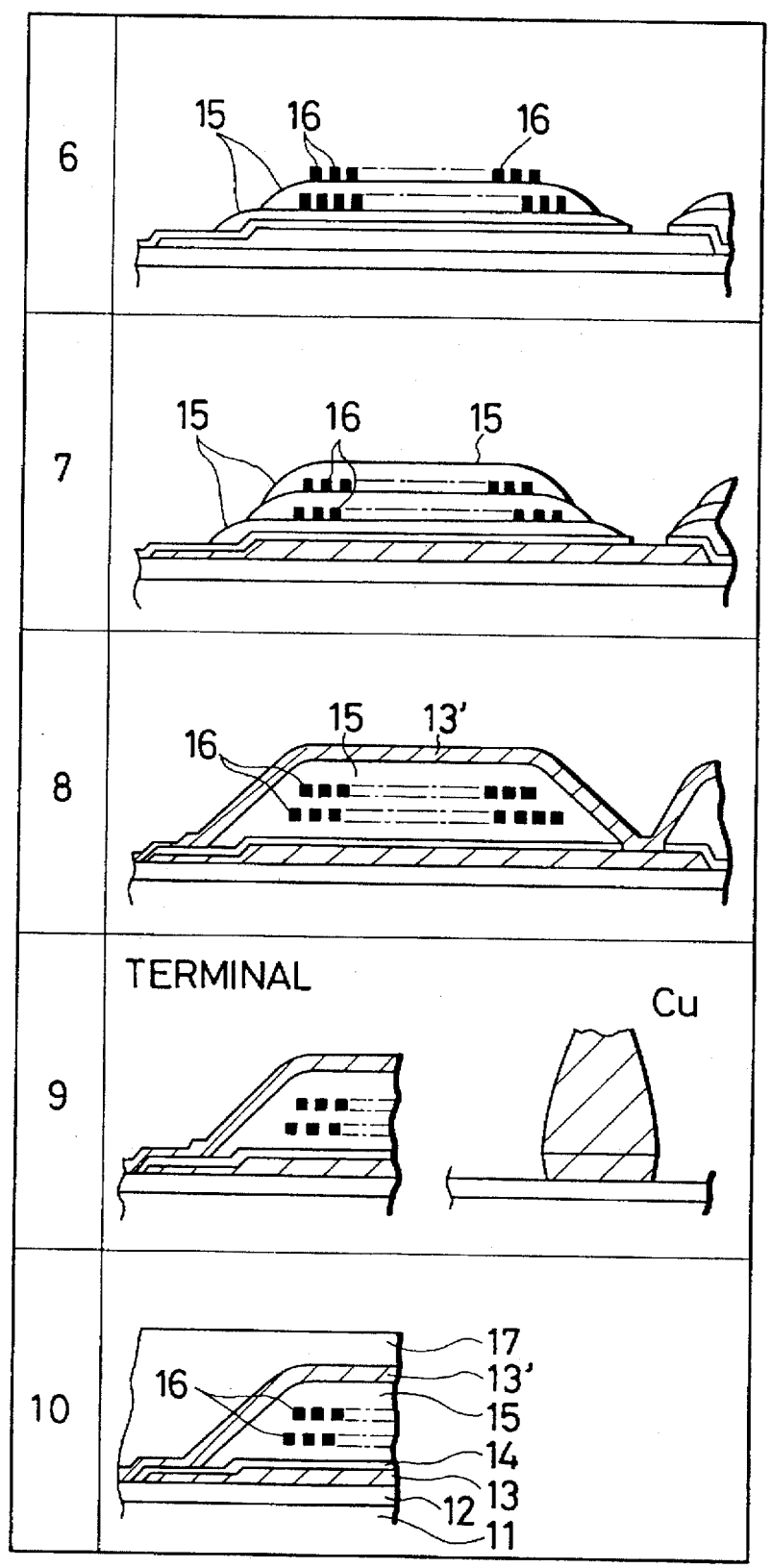
FIG. 6 is a schematic diagram showing the process (steps 6–10) for forming thin films of a thin film magnetic head.

Now, a production method for producing thin film magnetic heads will be described in detail next. Referring to FIGS. 5 and 6, the process for forming thin films of the thin film magnetic head will be described first. In the step (1), an under layer 12 composed off $Al_2O_3$ and $ZrO_2$ is formed by sputtering on a substrate 11 composed of sintered $Al_2O_3$—TiC. Then, a bottom magnetic film 13 composed of Permalloy is formed by sputtering on the under layer 12. This bottom magnetic film is etched by the ion milling method in conjunction with the photo lithography technology to form a magnetic core. Then, in the step of (2), a magnetic gap film 14 composed of $Al_2O_3$ and $ZrO_2$ is formed by sputtering on the magnetic core film 13. In the steps (3)–(7), further thereon, double layers of insulating film 15 are formed such that coil windings 16 are included between each insulating layer 15. The coil windings 18 are formed by the frame plating. The insulating films are formed by the process comprising the steps of: coating a positive photoresist, forming resist patterns, and baking the photoresist layer. In the step (8), after the insulating films 15 are formed, a top magnetic film 13' is formed in a way similar to that for the bottom magnetic core film 13. In the step (9), electric terminals are formed by plating. In the step (10), a protective layer 17 composed of $Al_2O_3$ and $ZrO_2$ is formed by sputtering. In this way, thin film magnetic head devices can be fabricated.

The characteristic aspect of the present invention is that inorganic insulating films composed of $Al_2O_3$ and $ZrO_2$ are used for an under layer 12, a magnetic gap film 14, and a protective layer 17. These inorganic insulating films are formed by sputtering a sintered target composed of 70 wt % $Al_2O_3$—30 wt % $ZrO_2$. In this sputtering process, Ar gas is used as a sputtering gas.

As for a method for patterning the bottom and top magnetic core films, it is also possible to use dry etching. Furthermore, as for a sputtering gas, $O_2$ or mixture gas of Ar—$O_2$ can be also used as well as Ar gas. From the point of sputtering rate, Ar is more desirable, although mixture of Ar—$O_2$ is desirable to obtain thin films with low residual stress. These two method may be properly selected depending on the purposes. As for magnetic films in thin film magnetic head, magnetic materials such as Ni-based alloys, Fe-based alloys, Co-based alloys can be also used as well as Permalloy.

Figure 7:
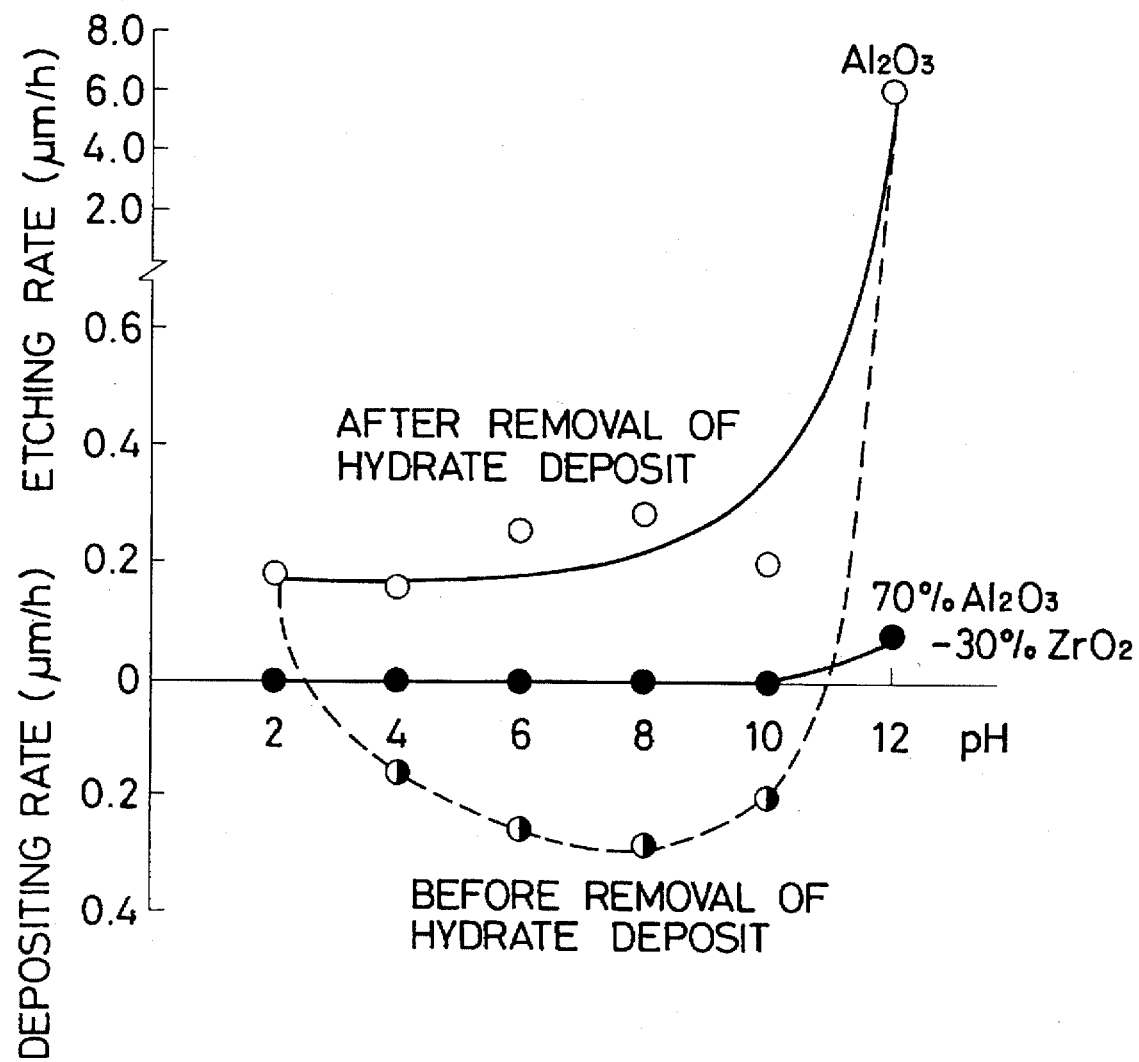
FIG. 7 is a graph showing etching rates of $Al_2O_3$ thin film and 70 wt % $Al_2O_3$—30 wt % $ZrO_2$ thin film as a function of pH of a solution.

FIG. 7 shows experimental results on etching rates of 70 wt % $Al_2O_3$—30 wt % $ZrO_2$ thin film used in the present embodiment, and also shows $Al_2O_3$ film used conventionally. Here, both films of 70 wt % $Al_2O_3$—30 wt % $ZrO_2$ and $Al_2O_3$ were formed by sputtering, and etching was carried out in solutions at 80° C. Here, pH of the solutions was adjusted by adding NaOH and HCl into deionized water. The deionized water used in this experiment showed resistivity larger than 10 MΩcm. $Al_2O_3$ film shows maximum etching rate as high as 6 µm/hr. In contrast to this, 70 wt % $Al_2O_3$—30 wt % $ZrO_2$ film shows the maximum etching rate as low as 0.1 µm/hr. In FIG. 7, the chain line shows the deposition rate or the generation rate of swelled hydrates produced by the reaction of the surface of 70 wt % $Al_2O_3$—30 wt % $ZrO_2$ film with the solution. The solid line shows the etching rate or the corrosion rate of the surface of the thin film after the hydrates are removed. If ultrasonic power is applied during the cleaning process, the hydrates can be removed more easily. In other figures, hereafter, the etching rate will be denoted by solid lines, and the deposition rate of the hydrates is denoted by chain lines.

Figure 8:
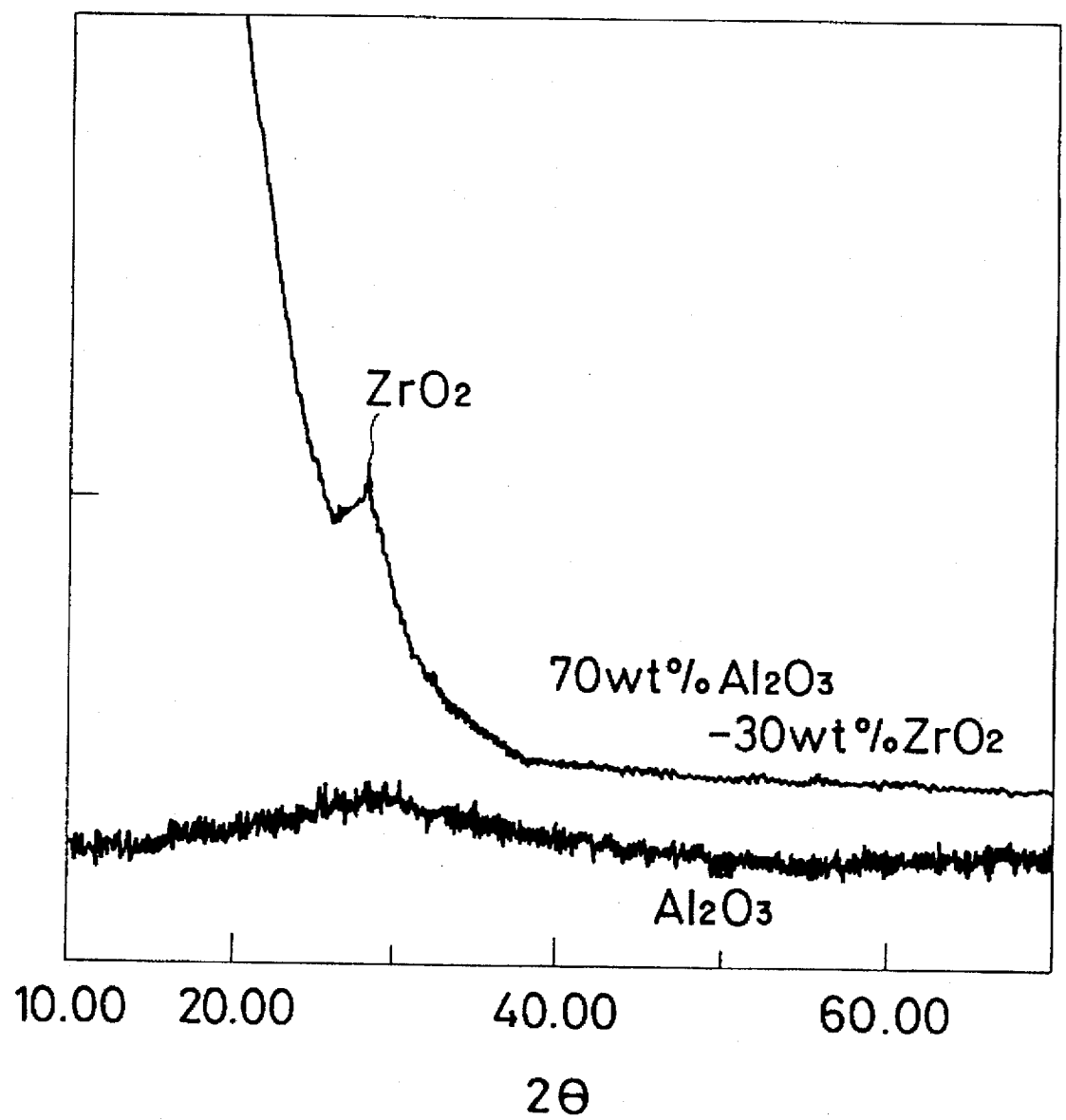
FIG. 8 is a graph showing the results of X-ray diffraction analysis of $Al_2O_3$ thin film and 70 wt % $Al_2O_3$—30 wt % $ZrO_2$ thin film.

FIG. 8 is a graph showing the results of X-ray diffraction analysis of $Al_2O_3$ thin film and 70 wt % $Al_2O_3$—30 wt % $ZrO_2$ thin film which are formed by sputtering. The pattern of $Al_2O_3$ film shows that the film is amorphous. In contrast to this, $Al_2O_3$ film containing $ZrO_2$ also shows the crystalline pattern in addition to the amorphous pattern. From this, it can be understood that $Al_2O_3$ film containing $ZrO_2$ is a mixture of amorphous and crystalline films.

Figure 9:
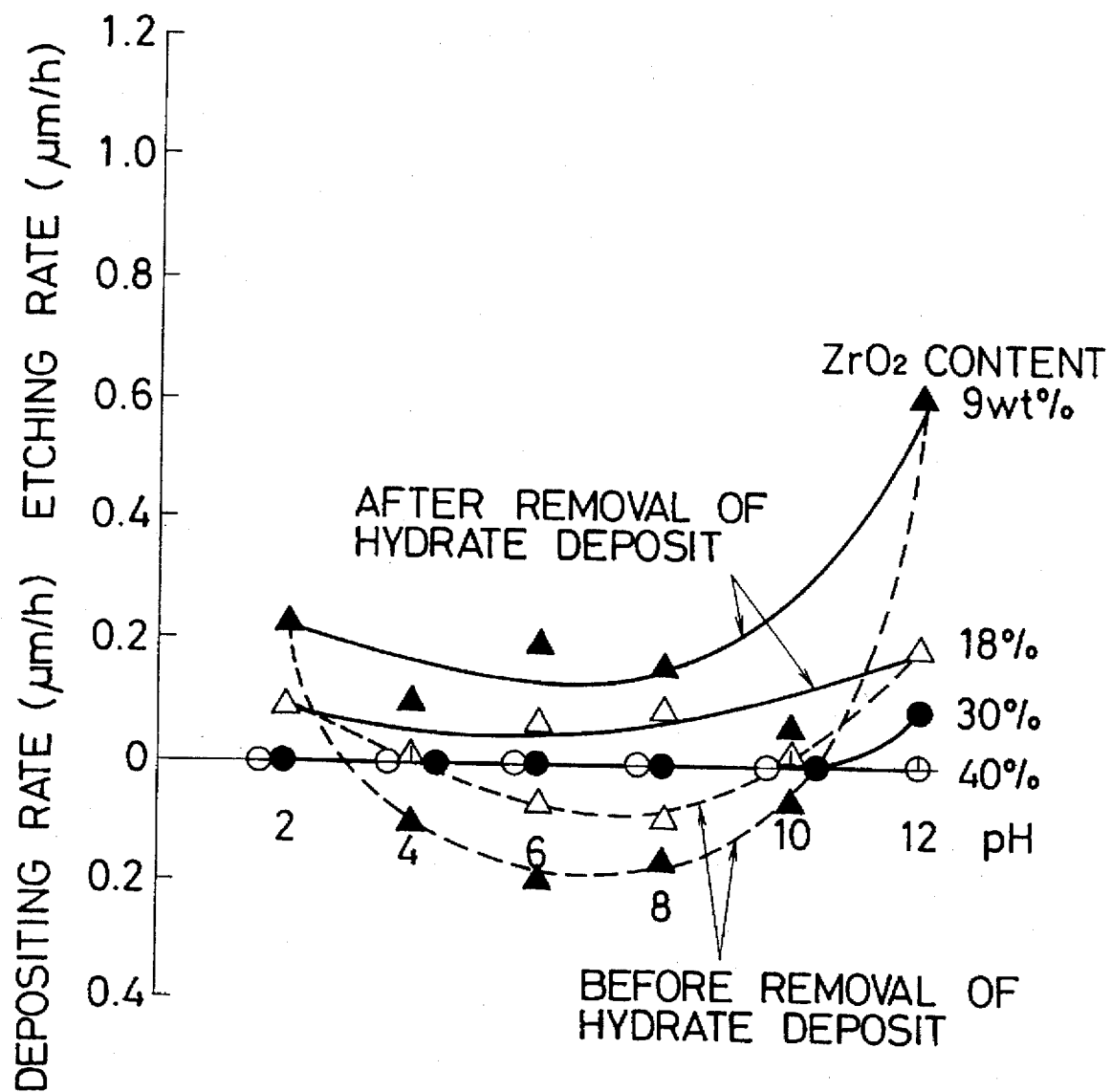
FIG. 9 is a graph showing etching rates of $Al_2O_3$—$ZrO_2$ thin film as a function of pH of a solution with a parameter of content of $ZrO_2$.

FIG. 9 is a graph showing the maximum etching rates of $Al_2O_3$—$ZrO_2$ thin film as a function of pH of a solution for various contents of films. Each $Al_2O_3$—$ZrO_2$ film used here was formed by sputtering. As the amount of $ZrO_2$ included in $Al_2O_3$—$ZrO_2$ film increases, the etching rate decreases, and the maximum etching rate becomes less than 100 nm/hr when the amount of $ZrO_2$ exceeds 15%. If the amount of $ZrO_2$ increases further to exceed 60%, then the transparency, the hardness, and processability become poor. Therefore, preferable amount of $Al_2O_3$ included in $Al_2O_3$—$ZrO_2$ film is 40–85% while preferable content of $ZrO_2$ is 15–60%.

For comparison, we produced two types of thin film magnetic heads: one is made by using 70 wt % $Al_2O_3$—30 wt % $ZrO_2$ films, having high corrosion resistance, for an under layer 12, a magnetic gap film 14, and a protective layer 17; the other is made using simple $Al_2O_3$ films for an under layer 12, a magnetic gap film 14, and a protective layer 17. Each type of thin film magnetic head was processed using the same lapping slurry and cleaning liquid under the same condition to form air bearing surfaces. Surface roughness of air bearing surfaces was evaluated for each type of thin film magnetic head. The pole tip recession of the thin film magnetic head of the present invention was 0.009 μm, but pole tip recession of the conventional type thin film magnetic head was as large as 0.028 μm. Measurement accuracy of the instrument used for this measurement was 0.001 μm.

The thin film magnetic head of the present invention was installed in the magnetic disk drive and recording and reproducing characteristics were measured keeping the flying height to 0.15 μm. The results of the measurement were good and stable for both of recording and reproducing. Furthermore, the measurement was also carried out after the flying height was reduced to 0.08 μm. The thin film magnetic head showed stable flying and there occurred no accident due to the contact of the thin film magnetic head to a recording medium, such as a head crash.

In this first embodiment of the thin film magnetic head of the present invention, thin films composed of $Al_2O_3$ and $ZrO_2$ are used as inorganic insulating films. However, the present invention is not limited to that. Thin film composed of $Al_2O_3$ and metal oxide having the oxidation number larger than that of $Al_2O_3$ such as $HfO_2$, $TiO_2$, $Y_2O_3$, $Ta_2O_5$, $Nb_2O_5$, $CeO_2$, $SiO_2$ can be also successfully used to get similar good results.

EMBODIMENT 2

A thin film magnetic head of a second embodiment has the same shape and the same number of thin films as those of the first embodiment. However, there is some difference in contents of those inorganic insulating films for an under layer 12, magnetic gap film 14, and a protective layer 17. That is, the under layer 12 is made up of 70 wt % $Al_2O_3$—30 wt % $ZrO_2$, and $Al_2O_3$ films formed by sputtering are used for the magnetic gap film 14 and for the protective layer 17.

EMBODIMENT 3

Thin films of a third embodiment are formed in the same way as in the case of first embodiment. That is, the thin films are formed by the same sputtering method to produce a thin film magnetic head. After that, the air bearing surface is lapped with lapping slurry to which etching suppression agent is added. Furthermore, cleaning liquid, to which etching suppression agent is added, is used for processing the slider, including the processing of the air bearing surface, in order to avoid contamination during processing the slider. Because $Al_2O_3$-based materials are used for the substrate and inorganic insulating films in this thin film magnetic head, phosphoric-acid-based etching suppression agent, $KH_2PO_4$ is used.

This embodiment can provide very small pole tip recessions such as 0.005 μm. In this embodiment, $KH_2PO_4$ is used as etching suppressing agent for suppressing the etching of inorganic insulating films, but this invention is not limited to that. Any other agents having etching suppression ability can be also used. Furthermore, agents which are effective to suppress etching of magnetic core films can be also used.

EMBODIMENT 4

Figure 10:
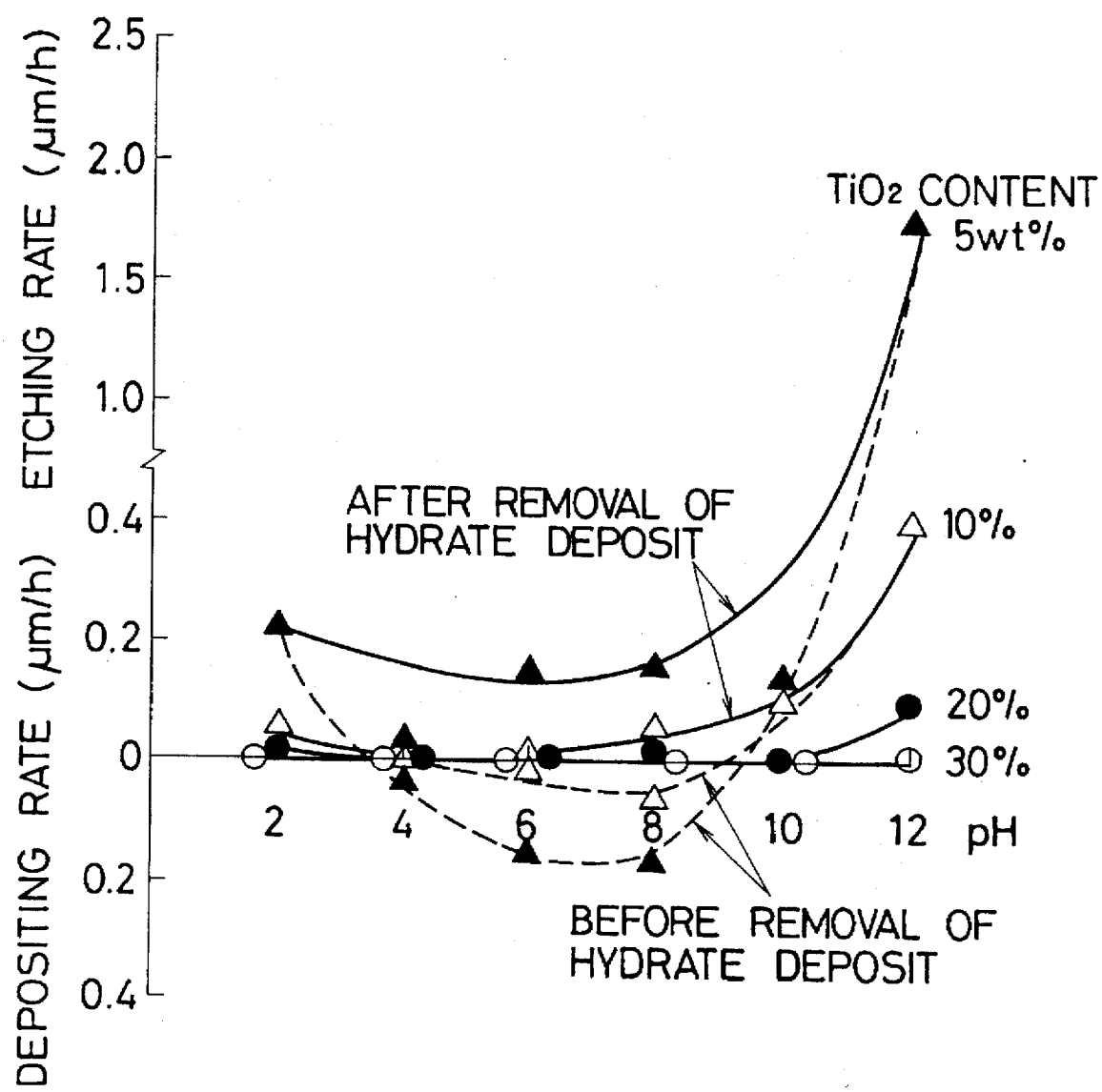
FIG. 10 is a graph showing etching rates of $Al_2O_3$—$TiO_2$ thin film as a function of pH of a solution with a parameter of content of $TiO_2$.

FIG. 10 is a graph showing etching rates of $Al_2O_3$—$TiO_2$ thin film as a function of pH of a solution for various contents of $TiO_2$. These $Al_2O_3$—$TiO_2$ films are formed by sputtering method using Ar gas at gas pressure of 1.3 Pa.

In the case of $Al_2O_3$—$ZrO_2$ films, as the content of $ZrO_2$ increases, the etching rate decreases, as described previously. Very similarly, in $Al_2O_3$—$TiO_2$ films, as the content of $TiO_2$ increases, the etching rate decreases. The films containing more than 10 wt % of $TiO_2$ show the etching rate less than 100 nm/hr for any pH value. However, when the amount of $TiO_2$ exceeds 60 wt %, hardness of the film becomes poor. Therefore, preferable contents of $Al_2O_3$ for this embodiment is 40–90 wt %, while contents of $TiO_2$ is 10–60 wt %.

EMBODIMENT 5

Figure 11:
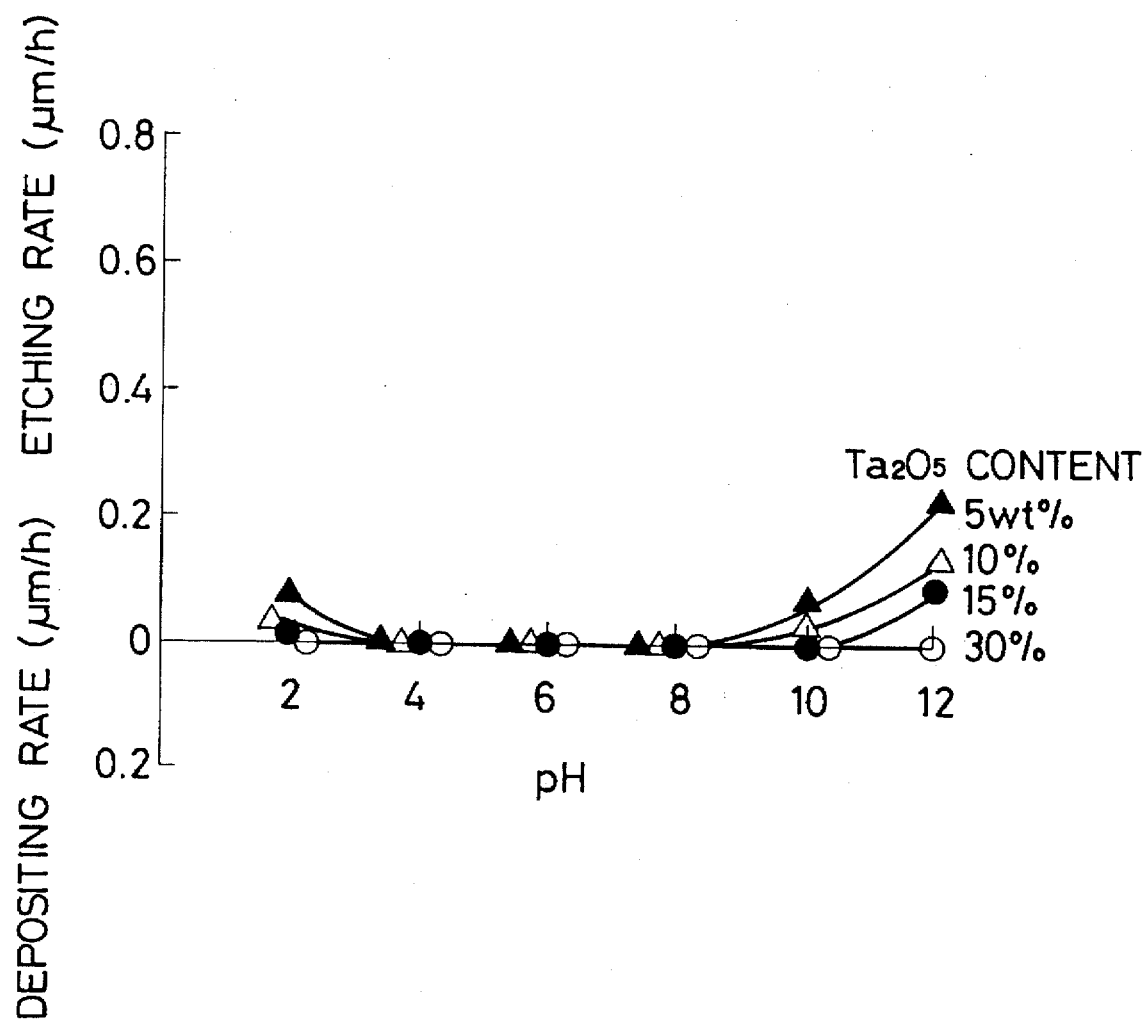
FIG. 11 is a graph showing etching rates of $Al_2O_3$—$Ta_2O_5$ thin film as a function of pH of a solution with a parameter of content of $Ta_2O_5$.

FIG. 11 is a graph showing etching rates of $Al_2O_3$—$Ta_2O_5$ thin film as a function of pH of a solution for various contents of $Ta_2O_5$. These $Al_2O_3$—$Ta_2O_5$ films are formed by sputtering a sintered target composed of $Al_2O_3$—$Ta_2O_5$ under the same sputtering condition as in the case of the first embodiment.

As in the case of $Al_2O_3$—$ZrO_2$ films, where as the content of $ZrO_2$ increases, the etching rate decreases, $Al_2O_3$—$Ta_2O_5$ films show the characteristic feature that as the content of $Ta_2O_5$ increases, the etching rate decreases. The films containing more than 15 wt % of $Ta_2O_5$ show the etching rate less than 100 nm/hr for any pH value. However, when the amount of $Ta_2O_5$ exceeds 70 wt %, hardness of the $Al_2O_3$—$Ta_2O_5$ becomes poor. Therefore, preferable contents of $Al_2O_3$ for this embodiment is 30–85 wt %, while contents of $Ta_2O_5$ is 15–70 wt %.

EMBODIMENT 6

Figure 12:
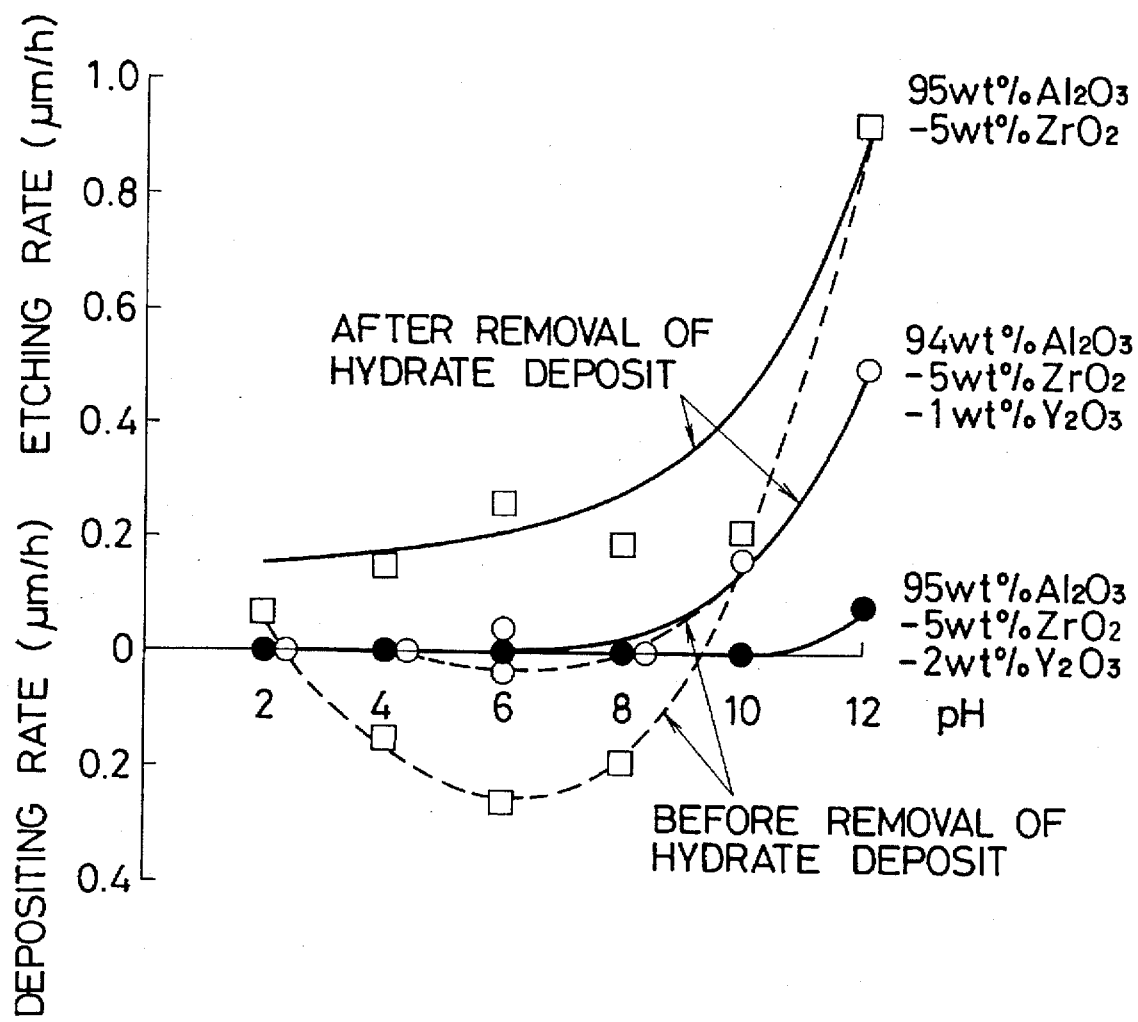
FIG. 12 is a graph showing etching rates of $Al_2O_3$—$ZrO_2$—$Y_2O_3$ thin film as a function of pH of a solution with a parameter of content of $ZrO_2$—$Y_2O_3$.

FIG. 12 is a graph showing etching rates of $Al_2O_3$—$ZrO_2$—$Y_2O_3$ film as a function of pH of a solution for various contents of $Y_2O_3$. These $Al_2O_3$—$ZrO_2$—$Y_2O_3$ films are formed by sputtering a sintered target composed of $Al_2O_3$—$ZrO_2$—$Y_2O_3$ using the mixture gas of Ar and $O_2$.

As in the case of $Al_2O_3$—$ZrO_2$ films, where as the content of $ZrO_2$ increases, the etching rate decreases, $Al_2O_3$—$ZrO_2$—$Y_2O_3$ films also show the characteristic feature that as the total content of $ZrO_2$ and $Y_2O_3$ increases, the etching rate decreases. The films containing more than 5 wt % of $ZrO_2$ and more than 2 wt % of $Y_2O_3$ show the etching rate less than 100 nm/hr for any pH value. However, when the amount of $ZrO_2$ exceeds 60 wt % and the amount of $Y_2O_3$ exceeds 10 wt %, transparency, hardness, and processability of the films become poor. Therefore, the preferable content of $Al_2O_3$ for this embodiment is 30–93 wt %, while the content of $ZrO_2$ is 5–60 wt %, and the content of $Y_2O_3$ is 2–10 wt %.

EMBODIMENT 7

Figure 13:
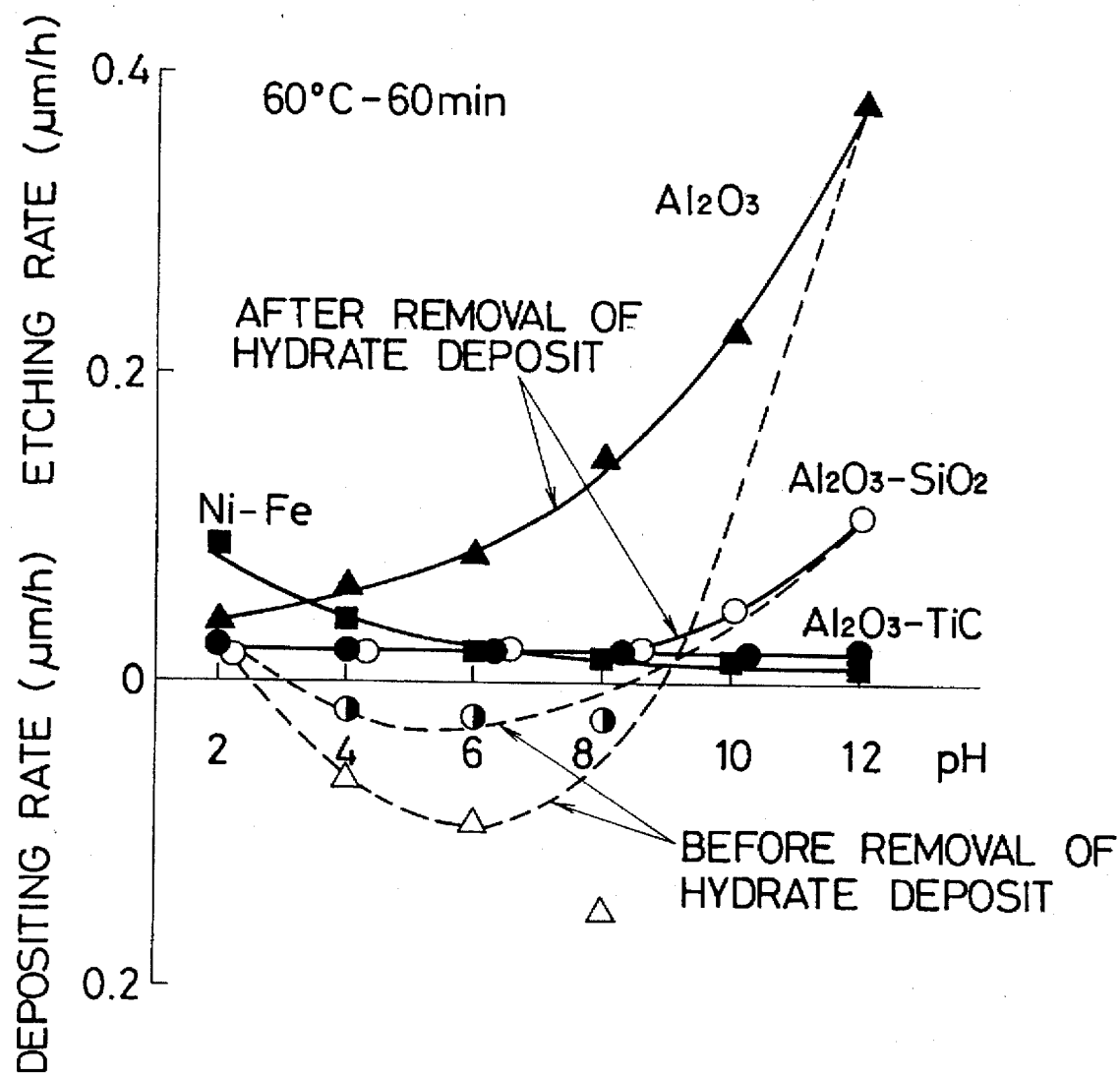
FIG. 13 is a graph showing etching rates of a sintered material of $Al_2O_3$—TiC and thin films of $Al_2O_3$, Ni—Fe, and $Al_2O_3$—$SiO_2$ as a function of pH of a solution.

FIG. 13 is a graph showing etching rates of a $Al_2O_3$ film, a $Al_2O_3$—$SiO_2$ film, a Ni—Fe film, and sintered material of $Al_2O_3$—TiC for the solution of pH 2 to pH 14. pH of the solutions was adjusted by adding NaOH and HCl to the solution as in the case of the first embodiment. $Al_2O_3$ films, $Al_2O_3$—$SiO_2$ films, and Ni—Fe films are formed by sputtering. An $Al_2O_3$ film, which has been used for an under layer 12, magnetic gap film 14 and a protective layer 17 in conventional thin film magnetic heads, can be easily dissolved and shows rather high etching rate for the solutions having pH larger than 4. Ni—Fe films, which are used for a bottom magnetic core film 13 and top magnetic core film 13', are easily dissolved in the acid solutions of pH less than 5, but are hardly dissolved and show small etching rate in the neutral or alkaline solutions of pH larger than 6. Sintered materials of $Al_2O_3$—TiC, which are used for a substrate, are hardly etched by the solutions of pH 2–12 and show small etching rates. $Al_2O_3$—$SiO_2$ films used in the present invention show small etching rates, which are similar to that of substrate material, for the solutions of pH less than 9. Therefore, in this embodiment, the substrate 11 is made of a sintered $Al_2O_3$—TiC material, the under layer 12, a magnetic gap film 14, and a protective layer 17 are made of $Al_2O_3$—$SiO_2$ films, and the bottom magnetic core film 13 and the top magnetic core film 13' are made of Ni—Fe films, to produce thin film magnetic heads. Then obtained thin film magnetic heads are lapped using the solutions of pH 6–8, thus resulting thin film magnetic head having a small pole tip recession on an air bearing surface.

Figure 14:
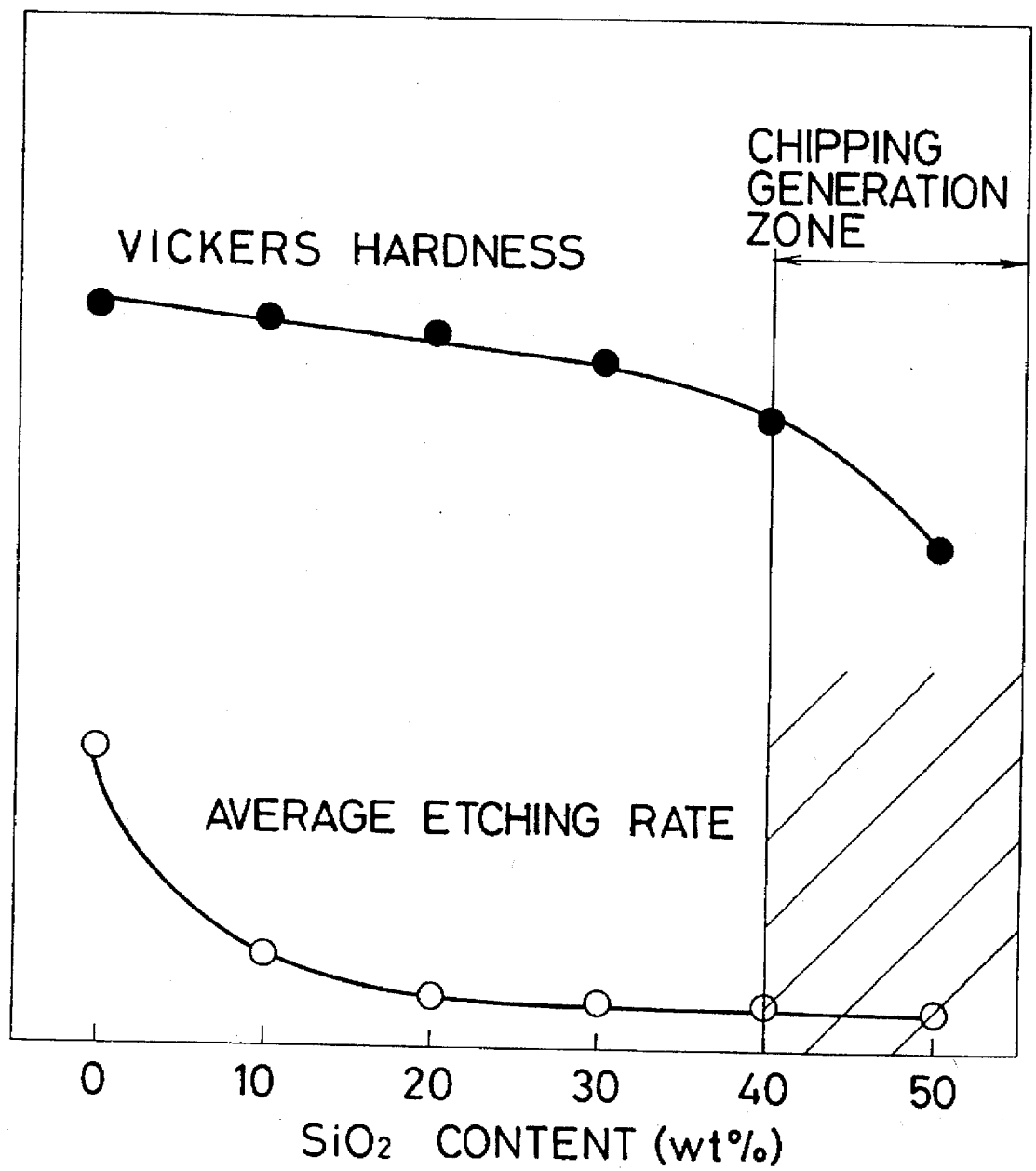
FIG. 14 is a graph showing Vicker's hardness and average etching rate for solutions of pH 6–8 as a function of $SiO_2$ content of $Al_2O_3$—$SiO_2$ thin film, and showing a chipping generation zone.

FIG. 14 is a graph showing Vicker's hardness and etching rates for lapping solutions of pH 6–8 as a function of $SiO_2$ content of $Al_2O_3$—$SiO_2$ film, and showing a chipping generation zone. Here, the temperature of lapping solutions is 60° C. As the content of $SiO_2$ increases, the etching rate of the $Al_2O_3$—$SiO_2$ films decreases. The films containing more than 15 wt % of $SiO_2$ show the almost constant etching rate. However, when the content of $SiO_2$ exceeds 40 wt %, hardness and processability of the films becomes poor. Therefore, preferable contents of $Al_2O_3$ for this embodiment is 60–85 wt %, while contents of $SiO_2$ is 15–40 wt %.

For comparison, we produced two types of thin film magnetic heads: one is made by using 70 wt % $Al_2O_3$—30 wt % $SiO_2$ films, having high corrosion resistance, for an under layer 12, a magnetic gap film 14, and a protective layer 17; the other is made using simple $Al_2O_3$ films for an under layer 12, a magnetic gap film 14, and a protective layer 17. The air bearing surfaces of each type of thin film magnetic head were lapped using the same lapping slurry and cleaning liquid whose pH was adjusted to 6–8. Surface roughness of resultant air bearing surfaces was measured for each type of thin film magnetic head. The pole tip recession of the thin film magnetic head of this embodiment of the present invention was 0.011 µm, but the pole tip recession of the conventional type thin film magnetic head was as large as 0.028 µm. Measurement accuracy of the instrument used for this measurement was 0.001 µm.

The thin film magnetic head of this embodiment of the present invention was installed in the magnetic disk drive and recording and reproducing characteristics were evaluated keeping the flying height to 0.15 µm. The results of the measurement were good and stable for both of recording and reproducing. There occurred no accident due to the contact of the head to a recording medium, such as a head crash.

EMBODIMENT 8

Figure 15:
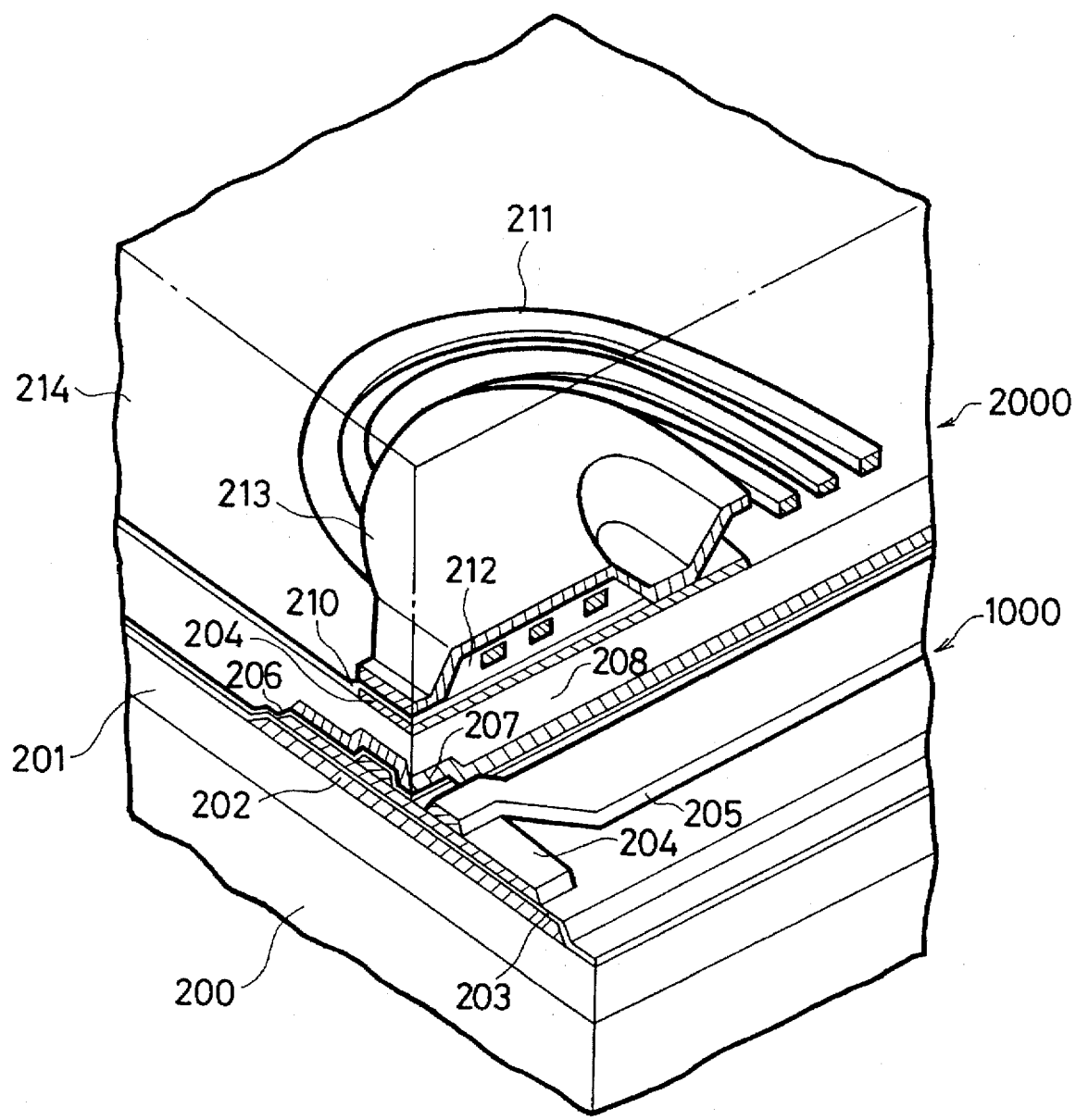
FIG. 15 is a perspective view of dual element read-write thin film magnetic head.

FIG. 15 is a perspective view of a thin film magnetic head having separated writing head and reading head. This thin film magnetic head comprises an under layer 201 formed on a nonmagnetic ceramic substrate 200, a magnetoresistance head 1000 just for reading, which operates by the magnetoresistance effect, formed on the under layer 201, and an electromagnetic induction writing head 2000 just for writing formed on the magnetoresistance head 1000 via a separation layer 208. The writing head 2000 is covered with protection layer 214. For simplicity, the right side half of the writing head 2000 and layers on the signal read electrode 205 in the right side of the magnetoresistance head 1000 are not shown in FIG. 15. The magnetoresistance effect is such an effect that when an external magnetic field is applied to ferromagnetic thin film materials having uniaxial anisotropy, the electric resistance of the materials changes due to the magnetization rotation. In contrast to the inductive head which detects the change in magnetic flux, the magnetoresistance head detects magnetic flux itself. As a result of this, the magnetoresistance head produces reading output signals which do not depend on the peripheral speed of the magnetic disk. Therefore, it is expected that the magnetoresistance head produce output signals which are 2–5 times as large as those produced by an inductive head, and that it has low noise reading characteristics. A magnetoresistance head 1000 comprises a magnetoresistance film 204 for detecting signals; a signal read electrode 205 for providing a current to the magnetoresistance film 204; upper and lower gap films 203 and 206 which are formed so that the magnetoresistance film 204 and the signal read electrode 205 are between these upper and lower gap films 203 and 208 and which are for making electrical and magnetic isolation between upper and lower magnetic shield layers 202 and 207, the magnetoresistance film 204, and the signal read electrode 205; and the upper and lower magnetic shield layers 202 and 207 for protecting the magnetoresistance films 204 against the affection of magnetic field other than signal magnetic field. The writing head 2000 has the same structure as that of the thin film magnetic head for both of writing and reading shown in FIG. 1. The writing head 2000 comprises top and bottom magnetic core films 209 and 213; a magnetic gap film 210; coil windings 211; and an insulating film 212. The substrate 200 is made of sintered $Al_2O_3$—TiC material. Ni—Fe alloy films are used for the top and bottom magnetic core films 209 and 213, and the upper and lower magnetic shield films 202 and 207, and the magnetoresistance films 204. A tungsten film is uses for the signal read electrode 205. The characteristic aspect of this embodiment is that inorganic insulating films of $Al_2O_3$—$SiO_2$ are used for the under layer 201, the upper and lower gap films 203 and 206, the separation layer 208, the magnetic gap film 210, and the protection layer 214. This inorganic insulating films are formed by sputtering a target of sintered 70 wt % $Al_2O_3$—30 wt % $SiO_2$. Ar gas is used as sputtering gas. After each head device was cut away from each other, the substrate of each head device is formed into a slider shape. Then, head devices are attached to a jig so that the side of an air bearing surface is up, and the air bearing surface is lapped so that the width of the magnetoresistance film becomes desired value. The lapping liquid has pH 6–8. To remove lapped head devices from the jig, removing liquid of pH 10 is used. Moreover, cleaning is carried out using deionized water at 60° C. This embodiment of the present invention can provide a thin film magnetic head having a small pole tip recession such as 0.008 μm.

The thin film magnetic head of this embodiment was installed in a magnetic disk drive and recording and reproducing characteristics were evaluated keeping the flying height to 0.15 μm. The results of the measurement were good and stable in both of recording and reproducing. There occurred no accident due to the contact of the head to a recording medium, such as a head crash.

In this embodiment, $Al_2O_3$—$SiO_2$ films are used as an inorganic insulating film to produce a thin film magnetic head having separated heads for each of writing and reading. However, this invention is not limited to that. Films composed of $Al_2O_3$ and metal oxide having the oxidation number which equals or is more than that of $Al_2O_3$, such as $HfO_2$, $TiO_2$, $ZrO_2$, and $Ta_2O_5$, can be also used. It is not necessary to use the same kind of film for all of films, the under layer 201, the upper and lower gap film 203 and 206, the separation layer 208, the magnetic gap film 210, and the protection layer 214. It is possible to select some films from those described above for any layers.

As described above in each embodiment, the present invention can solve the problems the conventional thin film magnetic heads have. That is, conventional thin film magnetic heads use $Al_2O_3$ films formed by sputtering for an under layer 12, a magnetic gap film 14, and a protective layer 17. But the $Al_2O_3$ films formed by sputtering produce hydrates when they are contact with deionized water. These hydrates are easily removed in vibrating deionized water, thus the $Al_2O_3$ films are etched more than Ni—Fe alloy films or sintered $Al_2O_3$-based materials. As a result of this, $Al_2O_3$ films are etched too much by lapping slurry or cleaning liquid during the lapping process, and the portions corresponding to $Al_2O_3$ films are recessed from other portions. The problems due to this can be solved by the present invention, that is, it is achieved to produce thin film magnetic heads having no pole tip recession on the air bearing surface.

Furthermore, the thin film magnetic head of the present invention has the advantage that the under layer and other layers are not degraded during the cleaning process using deionized water with no ions added to it. Another advantage of the present invention is that it is not needed to use Freon for cleaning process.

The present invention provide thin film magnetic heads which exhibit good writing and reading characteristics.

Because thin film magnetic heads of the present invention are lapped at the air bearing surface with good accuracy, the flying height can be reduced when they are installed in a magnetic disk drive thus achieving high recording density.

What is claimed is:

1. A thin film magnetic head, comprising:
an under layer formed on a substrate;
a bottom magnetic core film formed on said under layer;
a top magnetic core film which contacts said bottom magnetic core film on one side and which is opposed to said bottom magnetic core film via a magnetic gap film on the other side; and
a protective layer formed on said top magnetic core film;
wherein said under layer, said magnetic gap film, and said protective layer comprise 5 to 70 wt. % of at least one metal oxide having an oxidation number larger than that of $Al_2O_3$, and the balance $Al_2O_3$, whereby the thin film magnetic head is provided with reduced pole tip recession as compared to a magnetic head having an under layer, magnetic gap film and protective layer consisting of $Al_2O_3$.

2. A magnetic disk drive having a thin film magnetic head of claim 1.

3. A thin film magnetic head according to claim 1, wherein said underlayer, said magnetic gap film and said protective layer are formed by sputtering.

4. A thin film magnetic head according to claim 1, wherein said underlayer, said magnetic gap film and said protective layer are formed by sputtering in a sputtering gas comprising at least one of Ar and $O_2$.

5. A thin film magnetic head according to claim 1, wherein said underlayer, said magnetic gap film and said protective layer are formed by sputtering in a sputtering gas comprising Ar—$O_2$.

6. A thin film magnetic head, comprising:
an under layer formed on a substrate;
a bottom magnetic core film formed on said under layer;
a top magnetic core film which contacts said bottom magnetic core film on one side and which is opposed to said bottom magnetic core film via a magnetic gap film on the other side; and
a protective layer formed on said top magnetic core film;
wherein said under layer, said magnetic gap film, and said protective layer comprise at least one metal oxide selected from the group consisting of 15 to 60 wt. % $ZrO_2$, 15 to 60 wt. % $HfO_2$, 10 to 60 wt. % $TiO_2$, 5 to 70 wt. % $Ta_2O_5$, 5 to 70 wt. % $Nb_2O_5$, 5 to 40 wt. % $CeO_2$, and 10 to 40 wt. % $SiO_2$, and the balance of $Al_2O_3$, whereby the thin film magnetic head is provided with reduced pole tip recession as compared to a magnetic head having an under layer, magnetic flap film and protective layer consisting of $Al_2O_3$.

7. A thin film magnetic head according to claim 6, wherein said underlayer, said magnetic gap film and said protective layer are formed by sputtering.

8. A thin film magnetic head according to claim 6, wherein said underlayer, said magnetic gap film and said protective layer are formed by sputtering in a sputtering gas comprising at least one of Ar and $O_2$.

9. A thin film magnetic head according to claim 6, wherein said underlayer, said magnetic gap film and said protective layer are formed by sputtering in a sputtering gas comprising Ar—$O_2$.

10. A thin film magnetic head comprising an under layer formed on a substrate; a bottom magnetic core film formed on said under layer; a top magnetic core film which contacts said bottom magnetic core film on one side and which is opposed to said bottom magnetic core film via a magnetic gap film on the other side; and a protective layer formed on said top magnetic core film; wherein said under layer, said magnetic gap film, and said protective layer comprise at least 60 wt. % $Al_2O_3$ and 5 to 40 wt. % metal oxide having an oxidation number larger than that of $Al_2O_3$, and have a dissolving rate of 0.1–15 Å/min for warm water of pH 6–8 at temperatures 40°–60° C.

11. A thin film magnetic head according to claim 10, wherein said underlayer, said magnetic gap film and said protective layer are formed by sputtering.

12. A thin film magnetic head according to claim 10, wherein said underlayer, said magnetic gap film and said protective layer are formed by sputtering in a sputtering gas comprising at least one of Ar and $O_2$.

13. A thin film magnetic head according to claim 10, wherein said underlayer, said magnetic gap film and said protective layer are formed by sputtering in a sputtering gas comprising Ar—$O_2$.

14. A thin film magnetic head comprising an under layer formed on a substrate; a bottom magnetic core film formed on said under layer; a top magnetic core film which contacts said bottom magnetic core film on one side and which is opposed to said bottom magnetic core film via a magnetic gap film on the other side; and a protective layer formed on said top magnetic core film; wherein said under layer, said magnetic gap film, and said protective layer comprise at least 60 wt. % $Al_2O_3$ and 5 to 40 wt. % metal oxide having an oxidation number larger than that of $Al_2O_3$, and have etching rate of 1–100 nm/hr for deionized water of resistivity larger than 10 MΩcm.

15. A thin film magnetic head according to claim 14, wherein said underlayer, said magnetic gap film and said protective layer are formed by sputtering.

16. A thin film magnetic head according to claim 14, wherein said underlayer, said magnetic gap film and said protective layer are formed by sputtering in a sputtering gas comprising at least one of Ar and $O_2$.

17. A thin film magnetic head according to claim 14, wherein said underlayer, said magnetic gap film and said protective layer are formed by sputtering in a sputtering gas comprising Ar—$O_2$.

18. A thin film magnetic head comprising an under layer formed on a substrate; a bottom magnetic core film formed on said under layer; a top magnetic core film which contacts said bottom magnetic core film on one side and which is opposed to said bottom magnetic core film via a magnetic gap film on the other side; and a protective layer formed on said top magnetic core film; wherein said under layer, said magnetic gap film, and said protective layer comprise at least 60 wt. % $Al_2O_3$ and 5 to 40 wt. % metal oxide having an oxidation number larger than that of $Al_2O_3$, and have etching rate of 1–100 nm/hr for applying liquid of pH 6–8 and for removing liquid of pH 9–11.

19. A thin film magnetic head according to claim 18, wherein said underlayer, said magnetic gap film and said protective layer are formed by sputtering.

20. A thin film magnetic head according to claim 18, wherein said underlayer, said magnetic gap film and said protective layer are formed by sputtering in a sputtering gas comprising at least one of Ar and $O_2$.

21. A thin film magnetic head according to claim 18, wherein said underlayer, said magnetic gap film and said protective layer are formed by sputtering in a sputtering gas comprising Ar—$O_2$.

22. A thin film magnetic head comprising an under layer formed on a substrate comprising a sintered material; a bottom magnetic core film formed on said under layer; a top magnetic core film which contacts said bottom magnetic core film on one side and which is opposed to said bottom magnetic core film via a magnetic gap film on the other side; and a protective layer formed on said top magnetic core film; wherein said under layer, said magnetic gap film, and said protective layer are each a sputtered film comprising at least 60 wt. % $Al_2O_3$ and 5 to 40 wt. % metal oxide having an oxidation number larger than that of $Al_2O_3$, and is substantially the same as said substrate in dissolving rate for deionized water.

23. A thin film magnetic head according to claim 22, wherein said underlayer, said magnetic gap film and said protective layer are formed by sputtering.

24. A thin film magnetic head according to claim 22, wherein said underlayer, said magnetic gap film and said protective layer are formed by sputtering in a sputtering gas comprising at least one of Ar and $O_2$.

25. A thin film magnetic head according to claim 22, wherein said underlayer, said magnetic gap film and said protective layer are formed by sputtering in a sputtering gas comprising Ar—$O_2$.

26. A thin film magnetic head comprising an under layer formed on a substrate comprising a sintered material; a bottom magnetic core film formed on aid under layer; a top magnetic core film which contacts said bottom magnetic core film on one side and which is opposed to said bottom magnetic core film via a magnetic gap film on the other side; and a protective layer formed on said top magnetic core film; wherein said under layer, said magnetic gap film, and said protective layer are each a sputtered film comprising at least 60 wt. % $Al_2O_3$ and 5 to 40 wt. % metal oxide having an oxidation number larger than that of $Al_2O_3$, and is different from said substrate in dissolving rate by 0.1–15 Å/min.

27. A thin film magnetic head according to claim 26, wherein said underlayer, said magnetic gap film and said protective layer are formed by sputtering.

28. A thin film magnetic head according to claim 26, wherein said underlayer, said magnetic gap film and said protective layer are formed by sputtering in a sputtering gas comprising at least one of Ar and $O_2$.

29. A thin film magnetic head according to claim 26, wherein said underlayer, said magnetic gap film and said protective layer are formed by sputtering in a sputtering gas comprising Ar—$O_2$.

30. A thin film magnetic head comprising an under layer formed on a substrate; a bottom magnetic core film formed on said under layer; a top magnetic core film which contacts said bottom magnetic core film on one side and which is opposed to said bottom magnetic core film via a magnetic gap film on the other side; and a protective layer formed on said top magnetic core film; wherein said under layer, said magnetic gap film, and said protective layer comprise a material different from a material of said substrate, and said under layer, said magnetic gap film, and said protective layer comprise at least 60 wt. % $Al_2O_3$ and 5 to 40 wt. % metal oxide having an oxidation number larger than that of $Al_2O_3$, and have substantially the same dissolving rate as said substrate.

31. A thin film magnetic head according to claim 30, wherein said underlayer, said magnetic gap film and said protective layer are formed by sputtering.

32. A thin film magnetic head according to claim 30, wherein said underlayer, said magnetic gap film and said protective layer are formed by sputtering in a sputtering gas comprising at least one of Ar and $O_2$.

33. A thin film magnetic head according to claim 30, wherein said underlayer, said magnetic gap film and said protective layer are formed by sputtering in a sputtering gas comprising Ar—$O_2$.

34. A thin film magnetic head, comprising:
an under layer formed on a substrate;
a bottom magnetic core film formed on said under layer;
a top magnetic core film which contacts said bottom magnetic core film on one side and which is opposed to said bottom magnetic core film via a magnetic gap film on the other side; and a protective layer formed on said top magnetic core film;

wherein said under layer, said magnetic gap film, and said protective layer comprise 5 to 60 wt % $ZrO_2$, 2 to 10 wt % $Y_2O_3$ and the balance $Al_2O_3$, whereby the thin film magnetic head is provided with reduced pole tip recession as compared to a magnetic head having an under layer, magnetic gap film and protective layer consisting of $Al_2O_3$.

35. A thin film magnetic head, comprising:

an under layer formed on a substrate;

a bottom magnetic core film formed on said under layer;

a top magnetic core film which contacts said bottom magnetic core film on one side and which is opposed to said bottom magnetic core film via a magnetic gap film on the other side; and a protective layer formed on said top magnetic core film;

wherein said under layer, said magnetic gap film and said protective layer comprise 5 to 60 wt % $ZrO_2$, 2 to 10 wt % of at least one of $CeO_2$ and $Y_2O_3$, and the balance $Al_2O_3$, whereby the thin film magnetic head is provided with reduced pole tip recession as compared to a magnetic head having an under layer, magnetic gap film and protective layer consisting of $Al_2O_3$.

* * * * *